US009732190B2

(12) United States Patent
Kato et al.

(10) Patent No.: US 9,732,190 B2
(45) Date of Patent: Aug. 15, 2017

(54) PRODUCTION METHOD OF CRYSTALLINE POLYAMIDE RESIN

(75) Inventors: Koya Kato, Nagoya (JP); Atsushi Masunaga, Nagoya (JP); Eri Hatano, Nagoya (JP); Hideo Matsuoka, Nagoya (JP)

(73) Assignee: TORAY INDUSTRIES INC., Tokyo (JP)

(*) Notice: Subject to any disclaimer, the term of this patent is extended or adjusted under 35 U.S.C. 154(b) by 354 days.

(21) Appl. No.: 14/237,300

(22) PCT Filed: Aug. 13, 2012

(86) PCT No.: PCT/JP2012/005136
§ 371 (c)(1),
(2), (4) Date: Feb. 5, 2014

(87) PCT Pub. No.: WO2013/024593
PCT Pub. Date: Feb. 21, 2013

(65) Prior Publication Data
US 2014/0194570 A1 Jul. 10, 2014

(30) Foreign Application Priority Data

Aug. 17, 2011 (JP) ................................. 2011-178234
Sep. 27, 2011 (JP) ................................. 2011-210964

(51) Int. Cl.
| C08L 77/00 | (2006.01) |
| C08G 69/28 | (2006.01) |
| C08G 69/26 | (2006.01) |
| C08L 77/06 | (2006.01) |
| C08G 69/36 | (2006.01) |
| C08K 7/06 | (2006.01) |
| C08K 7/14 | (2006.01) |
| C08K 5/00 | (2006.01) |

(52) U.S. Cl.
CPC ........... *C08G 69/28* (2013.01); *C08G 69/265* (2013.01); *C08G 69/36* (2013.01); *C08K 7/06* (2013.01); *C08K 7/14* (2013.01); *C08L 77/06* (2013.01); *C08K 5/005* (2013.01)

(58) Field of Classification Search
CPC ........ C08G 69/28; C08G 69/30; C08G 69/26; C08G 69/265
USPC ....................................................... 524/607
See application file for complete search history.

(56) References Cited

U.S. PATENT DOCUMENTS

| 5,322,923 A * | 6/1994 | Lahary ................. C08G 69/265 528/340 |
| 5,656,717 A | 8/1997 | Leboeuf | |
| 5,663,284 A * | 9/1997 | Kominami ........... C08G 69/265 528/310 |
| 2010/0063245 A1* | 3/2010 | Rulkens ............... C08G 69/265 528/339 |
| 2011/0105683 A1 | 5/2011 | Kato et al. | |
| 2012/0165466 A1 | 6/2012 | Nitto et al. | |

FOREIGN PATENT DOCUMENTS

| EP | 2 415 801 A1 | 2/2012 |
| EP | 2 476 717 A1 | 7/2012 |
| JP | 8-500150 A | 1/1996 |
| JP | 2000-63512 A | 2/2000 |
| JP | 2003-292613 A | 10/2003 |
| JP | 2004-75962 A | 3/2004 |
| JP | 2010-121113 A | 6/2010 |
| JP | 2011-111576 A | 6/2011 |
| JP | 2011-225830 A | 11/2011 |
| JP | 2012-172086 A | 9/2012 |
| WO | WO 2007/085406 A1 | 8/2007 |
| WO | WO 2010/001846 A1 | 1/2010 |
| WO | WO 2010/113736 A1 | 10/2010 |
| WO | WO 2011/030742 A1 | 3/2011 |
| WO | WO 2011/122231 A1 | 10/2011 |

OTHER PUBLICATIONS

International Search Report, mailed Nov. 6, 2012, issued in PCT/JP2012/005136.

* cited by examiner

*Primary Examiner* — Jane L Stanley
(74) *Attorney, Agent, or Firm* — Birch, Stewart, Kolasch & Birch, LLP

(57) ABSTRACT

There is provided a production method of a crystalline polyamide resin by thermal polycondensation of a mixture including at least a diamine component, a dicarboxylic acid component and water as a starting material, wherein the diamine component includes (A) pentamethylene diamine at a ratio that is equal to or greater than 10 mol % and less than 80 mol % relative to a gross amount of the diamine component; and the dicarboxylic acid component includes (B) at least one selected from the group consisting of an aromatic dicarboxylic acid, an alicyclic dicarboxylic acid and dialkyl ester derivatives thereof at a ratio that is equal to or greater than 76 mol % and equal to or less than 100 mol % relative to a gross amount of the dicarboxylic acid component.

13 Claims, No Drawings

PRODUCTION METHOD OF CRYSTALLINE POLYAMIDE RESIN

TECHNICAL FIELD

The present invention relates to an efficient industrial production method of a crystalline polyamide resin, which has at least (A) pentamethylene diamine and (B) at least one selected from the group consisting of aromatic dicarboxylic acids, alicyclic dicarboxylic acids and their dialkyl ester derivatives, as structural components.

BACKGROUND ART

In the field of automobiles, as the approach to the environment, weight reduction of the vehicle body by metal substitution has been demanded for reduction of the emission. For this purpose, polyamide resins have been progressively employed for exterior materials and interior materials. Especially, accompanied with a temperature increase in the engine room, further improvement in heat resistance has been demanded for the polyamide resin used for the relevant parts. The polyamide resin has hydrophilic amide groups and accordingly has a problem of dimensional change caused by absorption of water.

In the field of electricity and electronics, on the other hand, along with development of lead-free systems and popularization of surface mount (SMT) there has been a demand for the polyamide resin of the high heat resistance that can withstand the high temperature treatment in the reflow oven. Another problem of the polyamide resin is the appearance of blister (air bubbles) in the reflow process, due to water absorption of the polyamide resin.

Additionally, as the adverse effects such as climate change accompanied by global warming have been addressed, reduction of carbon dioxide has been demanded and plant-derived plastics have attracted attention.

Patent Document 1 discloses a production method of a polyamide resin obtained by polycondensation of an aliphatic diamine as a mixture of hexamethylene diamine and 2-methylpentamethylene diamine and an aromatic dicarboxylic acid selected from, for example, terephthalic acid and isophthalic acid. Patent Document 2 discloses a polyamide resin that includes, as primary components, a terephthalic acid derivative and an aliphatic diamine mainly comprised of pentamethylene diamine which is manufactured from a plant material and hexamethylene diamine. Unlike 2-methylpentamethylene diamine, pentamethylene diamine is a symmetrical molecule with no substituent group in its side chain. A polyamide resin obtained from pentamethylene diamine has excellent crystallinity and is thus likely to precipitate in the course of polymerization. It has accordingly been regarded as difficult to achieve high polymerization by only melt polymerization. Patent Document 3 also discloses a polyamide resin that includes, as structural components, pentamethylene diamine and terephthalic acid or its derivative. Patent Document 3 employs solid phase polymerization as the production method of a crystalline polyamide resin having a melting point of or above 270° C. Additionally, in the case of polymerization of a polyamide resin using a highly hydrophobic compound such as diaminononane or diaminodecane as at least part of the diamine component, there is also a problem that polymer is likely to precipitate in the course of polymerization of the polyamide resin in the presence of water, due to the high hydrophobicity of the above diamine component.

Patent Document 4, on the other hand, discloses a polyamide resin that includes, as structural components, pentamethylene diamine, terephthalic acid and sebacic acid. Additionally, Patent Document 5 discloses a polyamide resin obtained by polymerization of an alicyclic dicarboxylic acid and a diamine including a diamine having a pentamethylene diamine skeleton. The polyamide resin using pentamethylene diamine specifically described in these patent documents has a small content of terephthalic acid relative to the gross amount of the dicarboxylic acid component or a small content of an alicyclic dicarboxylic acid relative to the gross amount of the dicarboxylic acid component and has the low crystallinity. Accordingly there is little possibility that polymer precipitates in the course of polymerization.

PRIOR ART DOCUMENTS

Patent Documents

Patent Document 1: JP H08-500150A (translation of PCT application)
Patent Document 2: JP 2003-292613A
Patent Document 3: WO 2010/001846A
Patent Document 4: JP 2011-111576A
Patent Document 5: WO 2011/030742A

SUMMARY OF THE INVENTION

Problems to be Solved by the Invention

The polyamide resin using pentamethylene diamine as the diamine component has characteristics such as high crystallinity, excellent heat resistance and low water absorption. The object of the invention is to provide an efficient industrial production method of the crystalline polyamide resin having such excellent characteristics.

Means for Solving the Problems

The inventors have found that a crystalline polyamide resin can efficiently be produced by high-degree melt polymerization of monomers including pentamethylene diamine and at least one selected from the group consisting of aromatic dicarboxylic acids, alicyclic dicarboxylic acids and their dialkyl ester derivatives at a temperature of not lower than a melting point via an oligomerization reaction under a high pressure condition.

The present invention is accordingly made to solve at least part of the problems described above and may be implemented by the following aspects.

(i) There is provided a production method of a crystalline polyamide resin by thermal polycondensation of a mixture including at least a diamine component, a dicarboxylic acid component and water as a starting material, wherein the diamine component includes (A) pentamethylene diamine at a ratio that is equal to or greater than 10 mol % and less than 80 mol % relative to a gross amount of the diamine component; and the dicarboxylic acid component includes (B) at least one selected from the group consisting of an aromatic dicarboxylic acid, an alicyclic dicarboxylic acid and dialkyl ester derivatives thereof at a ratio that is equal to or greater than 76 mol % and equal to or less than 100 mol % relative to a gross amount of the dicarboxylic acid component, the production method comprising: a first step that heats the mixture, which has a water content equal to or less than 30% by weight, at a temperature equal to or higher than 200° C.

under a pressure of 1.8 to 3.5 MPa to perform polycondensation with distillation of water; a second step that releases pressure to an atmospheric pressure level, subsequent to the first step; and a third step that continues thermal polycondensation subsequent to the second step, so as to obtain the crystalline polyamide resin, the third step performing high-degree melt polymerization at a temperature that is equal to or higher than a melting point of the crystalline polyamide resin until a relative viscosity at 25° C. of a solution prepared by dissolving the obtained crystalline polyamide resin at a concentration of 0.01 mg/mL in 98% sulfuric acid reaches between 1.8 and 3.5.

(ii) There is provided the production method of the crystalline polyamide resin described in (i), wherein the crystalline polyamide resin has a temperature of an endothermic peak corresponding to the melting point measured by using a differential scanning calorimeter, which is equal to or higher than 270° C. when temperature is decreased from a molten state to 30° C. at a temperature decrease rate of 20° C./minute and is subsequently increased at a temperature increase rate of 20° C./minute.

(iii) There is provided the production method of the crystalline polyamide resin described in either one of (i) and (ii), wherein the crystalline polyamide resin has heat of fusion measured by using a differential scanning calorimeter, which is equal to or greater than 30 J/g when temperature is decreased from a molten state to 30° C. at a temperature decrease rate of 20° C./minute and is subsequently increased at a temperature increase rate of 20° C./minute.

(iv) There is provided the production method of the crystalline polyamide resin described in any one of (i) to (iii), wherein a temperature at a start of pressure relief is equal to or lower than 295° C., and a temperature at an end of pressure relief is equal to or higher than the melting point in the second step.

(v) There is provided the production method of the crystalline polyamide resin described in any one of (i) to (iv), wherein the high-degree melt polymerization in the third step is performed under reduced pressure or under an inert gas atmosphere.

(vi) There is provided a crystalline polyamide resin produced by thermal polycondensation of at least a diamine component and a dicarboxylic acid component, wherein the diamine component includes (A) pentamethylene diamine at a ratio that is equal to or greater than 10 mol % and less than 80 mol % relative to a gross amount of the diamine component, and the dicarboxylic acid component includes (B) at least one selected from the group consisting of an aromatic dicarboxylic acid, an alicyclic dicarboxylic acid and dialkyl ester derivatives thereof at a ratio that is equal to or greater than 76 mol % and equal to or less than 100 mol % relative to a gross amount of the dicarboxylic acid component; the crystalline polyamide resin having a relative viscosity between 1.8 and 3.5 at 25° C. of a solution prepared by dissolving the crystalline polyamide resin at a concentration of 0.01 mg/mL in 98% sulfuric acid, and having a degree of dispersion (weight-average molecular weight/number-average molecular weight) equal to or less than 3.5 measured by gel permeation chromatography.

(vii) There is provided the crystalline polyamide resin described in (vi), the crystalline polyamide resin having a temperature of an endothermic peak corresponding to a melting point measured by using a differential scanning calorimeter, which is equal to or higher than 270° C. when temperature is decreased from a molten state to 30° C. at a temperature decrease rate of 20° C./minute and is subsequently increased at a temperature increase rate of 20° C./minute.

(viii) There is provided the crystalline polyamide resin described in either one of (vi) and (vii), the crystalline polyamide resin having heat of fusion measured by using a differential scanning calorimeter, which is equal to or greater than 30 J/g measured by using a differential scanning calorimeter when temperature is decreased from a molten state to 30° C. at a temperature decrease rate of 20° C./minute and is subsequently increased at a temperature increase rate of 20° C./minute.

(ix) There is provided the crystalline polyamide resin described in any one of (vi) to (viii), the crystalline polyamide resin having a piperidine content that is equal to or less than $10.0 \times 10^5$ mol/g.

(x) There is provided the crystalline polyamide resin described in any one of (vi) to (ix), wherein (B) the at least one selected from the group consisting of the aromatic dicarboxylic acid, the alicyclic dicarboxylic acid and the dialkyl ester derivatives thereof includes at least an aromatic dicarboxylic acid, and the aromatic dicarboxylic acid is terephthalic acid and/or isophthalic acid.

(xi) There is provided a molded product produced by molding the crystalline polyamide resin described in any one of (vi) to (x).

(xii) There is provided a polyamide resin composition produced by further adding an inorganic filler to the crystalline polyamide resin described in any one of (vi) to (x).

(xiii) There is provided a polyamide resin composition produced by further adding an impact modifier to the crystalline polyamide resin described in any one of (vi) to (x).

(xiv) There is provided a molded product produced by molding the crystalline polyamide resin composition described in either one of (xii) and (xiii).

Advantageous Effects of the Invention

The present invention enables a crystalline polyamide resin having excellent heat resistance and low water absorption to be efficiently obtained.

MODE FOR CARRYING OUT THE INVENTION

In the embodiments of the invention, diamines are defined as diamine component, and dicarboxylic acids and dialkyl dicarboxylates are defined as dicarboxylic acid component.

A production method of a crystalline polyamide resin according to an embodiment of the invention performs thermal polycondensation of a mixture including at least (A) pentamethylene diamine, (B) at least one selected from the group consisting of aromatic dicarboxylic acids, alicyclic dicarboxylic acids and their dialkyl ester derivatives, and water as a starting material. In the embodiments of the invention, thermal polycondensation is defined as a production process of polycondensation with controlling the maximum temperature of a starting material, an intermediate product or a crystalline polyamide resin at the time of manufacture to or higher than 200° C. The crystalline polyamide resin described in the embodiments of the invention is defined as a polyamide resin having a heat quantity of a melting peak (heat of fusion) equal to or greater than 10 J/g measured by using a differential scanning calorimeter under an inert gas atmosphere, wherein the melting peak appears when the temperature is decreased from the molten state to 30° C. at a temperature decrease rate of 20°

C./minute and is subsequently increased at a temperature increase rate of 20° C./minute.

Polyamide resins have, for example, diamines, dicarboxylic acids and their dialkyl ester derivatives, aminocarboxylic acids and lactams as structural components. A crystalline polyamide resin according to an embodiment of the invention has at least (A) pentamethylene diamine and (B) at least one selected from the group consisting of aromatic dicarboxylic acids, alicyclic dicarboxylic acids and their dialkyl ester derivatives, as structural components. The crystalline polyamide resin according to the embodiment of the invention may further have another monomer copolymerized. According to an embodiment of the invention, it is preferable that the ratio of the total weight of (A) pentamethylene diamine and (B) at least one selected from the group consisting of aromatic dicarboxylic acids, alicyclic dicarboxylic acids and their dialkyl ester derivatives to the gross weight of all the structural components (monomers) constituting the crystalline polyamide resin is not less than 50% by weight. Such composition further improves the heat resistance and the melt retention stability of the resulting crystalline polyamide resin. The ratio of the above total weight to the above gross weight is more preferably not less than 55% by weight and is furthermore preferably not less than 60% by weight. It is, on the other hand, preferable that the ratio of the above total weight to the above gross weight is not greater than 95% by weight. This further improves the molding processability of the resulting crystalline polyamide resin. The ratio of the above total weight to the above gross weight is more preferably not greater than 90% by weight and is furthermore preferably less than 80% by weight.

Proposed methods for producing pentamethylene diamine used as the component (A) according to the embodiment of the invention include: for example, a method of chemical synthesis from lysine using vinyl ketones such as 2-cyclohexene-1-one as the catalyst (JP S60-23328A); an enzyme method of conversion from lysine using lysine decarboxylase (JP 2004-0114A and JP 2005-6650A); and a fermentation method using sugars as the raw material (JP 2004-222569A and WO 2007/113127A). While the reaction temperature is as high as about 150° C. in the chemical synthesis method, the reaction temperature is lower than 100° C. in the enzyme method and the fermentation method. Using the latter methods is thus expected to cause less side reactions. It is accordingly preferable to use pentamethylene diamine obtained by the latter methods. Pentamethylene diamine obtained by the latter methods is the plant-derived raw material and is also recommended from the standpoint of reducing global warming.

Available examples of the aromatic dicarboxylic acid and its dialkyl ester derivative used as the component (B) according to the embodiment of the invention include terephthalic acid, dimethyl terephthalate, diethyl terephthalate, isophthalic acid, dimethyl isophthalate, phthalic acid, 2,6-naphthalene dicarboxylic acid, 4,4'-diphenyl dicarboxylic acid, 1,5-naphthalene dicarboxylic acid, bis(p-carboxyphenyl)methane, anthracene dicarboxylic acid, 4,4'-diphenyl ether dicarboxylic acid and sodium 5-sulfoisophthalate. Two or more of these may be used. Available examples of the alicyclic dicarboxylic acid and its dialkyl ester derivative used as the component (B) according to the embodiment of the invention include 1,4-cyclohexane dicarboxylic acid, dimethyl 1,4-cylohexane dicarboxylates, 1,3-cyclohexane dicarboxylic acid, dimethyl 1,3-cylohexane dicarboxylates, 1,2-cyclohexane dicarboxylic acid, dimethyl 1,2-cylohexane dicarboxylates and 1,3-cyclopentane dicarboxylic acid. Two or more of these may be used. Among them, terephthalic acid and isophthalic acid are used preferably.

Available examples of a copolymerizable component other than the components (A) and (B) include: aliphatic dicarboxylic acids such as oxalic acid, malonic acid, succinic acid, glutaric acid, adipic acid, pimelic acid, suberic acid, azelaic acid, sebacic acid, undecanedioic acid, dodecanedioic acid, tridecanedioic acid, tetradecanedioic acid, pentadecanedioic acid and hexadecanedioic acid and their dialkyl ester derivatives; aliphatic diamines such as ethylene diamine, 1,3-diaminopropane, 1,4-diaminobutane, 1,6-diaminohexane, 1,7-diamonoheptane, 1,8-diaminooctane, 1,9-diaminononane, 1,10-diaminodecane, 1,11-diaminoundecane, 1,12-diaminododecane, 1,13-diaminotridecane, 1,14-diaminotetradecane, 1,15-diaminopentadecane, 1,16-diaminohexadecane, 1,17-diaminoheptadecane, 1,18-diaminooctadecane, 1,19-diaminononadecane, 1,20-diaminoeicosane, 2-methyl-1,5-diaminopentane and 2-methyl-1,8-octanediamine; alicyclic diamines such as cyclohexane diamine and bis-(4-aminocyclohexyl)methane; aromatic diamines such as xylylene diamine; amino acids such as 6-aminocaproic acid, 11-aminoundecanoic acid, 12-aminododecanoic acid and para-aminomethylbenzoic acid; and lactams such as ε-caprolactam and ω-laurolactam. Two or more of these may be used.

Among them, in order to produce especially a polyamide resin having more excellent molding processability, more excellent crystallinity and lower water absorption, it is preferable to use, as the diamine component, a diamine with no substituent group in a side chain selected among 1,6-diaminohexane, 1,9-diaminononane, 1,10-diaminodecane, 1,11-diaminoundecane and 1,12-diaminododecane, in addition to the component (A). More preferable are 1,6-diaminohexane, 1,10-diaminodecane and 1,12-diaminododecane. In the case of using in combination with a dicarboxylic acid other than the component (B) as the dicarboxylic acid component, it is preferable to use an aliphatic dicarboxylic acid such as adipic acid, azelaic acid, sebacic acid, undecanedioic acid and dodecanedioic acid. In order to obtain a crystalline polyamide resin having more excellent heat resistance, it is preferable that the ratio of these aliphatic dicarboxylic acids to the gross amount of the dicarboxylic acid component is not greater than 24 mol %. The ratio of the above aliphatic dicarboxylic acids to the gross amount of the dicarboxylic acid component is more preferably not greater than 15 mol % and is most preferably not greater than 10 mol %.

According to an embodiment of the invention, the monomers of these components (A) and (B) may be used as the raw materials without any pretreatment or may be used as the raw materials after salt formation reaction.

Additionally, in the case of placing importance on the low water absorption, it is preferable to use a component selected among 11-aminoundecanoic acid, 12-aminododecanoic acid and ω-caprolactam, as the copolymerizable component with the components (A) and (B). In order to maintain the heat resistance of the polyamide resin, the ratio of these components to the gross amount of the monomers constituting the polyamide resin is preferably not greater than 20% by weight and is more preferably not greater than 10% by weight.

In general, among polyamide resins composed of diamines and dicarboxylic acids, the polyamide resin using an aromatic dicarboxylic acid or an alicyclic dicarboxylic acid as the dicarboxylic acid component has the higher melting point than the polyamide resin using an aliphatic dicarboxylic acid as the dicarboxylic acid component and is likely to cause significant side reactions and gelate when being exposed to temperatures equal to or higher than the melting point for a long time (as described in Encyclopedia of Polymer Science and Technology, Vol. 10, p 546, a secondary amine produced by deammoniation reaction of terminal amino groups works as the cross-linking point). The higher melting point of the polyamide resin facilitates gelation. For this reason, the method generally employed to produce a polyamide resin having a high melting point is a two-step process that synthesizes an oligomer by prepolymerization and subsequently performs solid phase polymerization to achieve a high degree of polymerization at the temperature of lower than the melting point or uses an extruder to achieve a high degree of polymerization in a short time under the high temperature of not lower than the melting point. On the other hand, the embodiment of the invention focuses on the finding that containing pentamethylene diamine as the diamine component suppresses gelation even in the event of exposure to the temperatures equal to or higher than the melting point for a long time and enables production by a one-step melt polymerization process when producing a polyamide resin having an aromatic dicarboxylic acid, an alicyclic dicarboxylic acid and/or a dialkyl ester derivative thereof as the structural component. The reason why the polyamide resin using pentamethylene diamine as the raw material can be produced by the one-step melt polymerization process is attributed to that pentamethylene diamine has the nature of causing an intramolecular cyclization reaction. In other words, even when the raw material including pentamethylene diamine is exposed to the temperature equal to or higher than the melting point of pentamethylene diamine for a long time, the self-cyclization reaction of the terminal diamine proceeds prior to the deammoniation reaction of the terminal diamines and thereby retards production of a secondary amine.

From the above standpoint, the ratio of the component (A) according to the embodiment of the invention to the gross amount of the diamine component constituting the crystalline polyamide resin is not less than 10 mol %, is more preferably not less than 20 mol %, is furthermore preferably not less than 30 mol % and is most preferably not less than 40 mol %. When the ratio of the component (A) to the gross amount of the diamine component is less than 10 mol %, the resulting crystalline polyamide resin has a remarkably increased melting point and thereby has difficulty in the molding process.

Additionally, in general, a large content of the (B) component as the dicarboxylic acid component may remarkably increase the melting point of the crystalline polyamide resin depending on its composition and may thereby lead to difficulty in the molding process. For this reason, the embodiment of the invention uses (A) pentamethylene diamine and a diamine other than the component (A) in combination as the diamine component to control the melting point. According to the embodiment of the invention, the ratio of (A) pentamethylene diamine to the gross amount of the diamine component constituting the crystalline polyamide resin is less than 80 mol %. When the ratio of the component (A) to the gross amount of the diamine component is not less than 80 mol %, the resulting crystalline polyamide resin is likely to have a remarkably increased melting point and have difficulty in the molding process. The ratio of the component (A) to the gross amount of the diamine component is more preferably not greater than 70 mol % and is most preferably not greater than 60 mol %.

From the standpoint of improving the crystallinity and the glass transition temperature of the crystalline polyamide resin, on the other hand, according to the embodiment of the invention, the ratio of the component (B) to the gross amount of the dicarboxylic acid component constituting the crystalline polyamide resin is not less than 76 mol %. The ratio of the component (B) to the gross amount of the dicarboxylic acid component that is less than 76 mol % reduces the heat resistance and the crystallinity of the resulting polyamide resin. The ratio of the component (B) to the gross amount of the dicarboxylic acid component is more preferably not less than 80 mol %, is furthermore preferably not less than 90 mol % and is most preferably 100 mol %.

The production method of the crystalline polyamide resin according to the embodiment of the invention includes a first step that heats a mixture including the component (A), the component (B), other structural components if desired, and water under pressure to perform polycondensation while removing water.

In production of the polyamide resin, it is difficult to completely prevent volatilization of the diamine component even under the high pressure condition. In the course of polymerization, pentamethylene diamine and piperidine produced by its cyclization reaction may volatilize. Additionally, piperidine produced by the cyclization reaction works as the terminal blocking agent. For this reason, with progress of polymerization, it is likely to decrease the total amount of amino groups relative to the total amount of carboxyl groups in the polymerization system and slow the rate of polymerization. In order to obtain a crystalline polyamide resin having the higher molecular weight, it is accordingly preferable to preliminarily add an excess amount of the diamine component and increase the amount of amino groups in the polymerization system at the stage of feeding the raw materials. More specifically, it is preferable to adjust the raw material composition ratio to a/b of 1.001 to 1.1, where a represents the mole number of the diamine component including pentamethylene diamine used as the raw material and b represents the mole number of the dicarboxylic acid component including the aromatic dicarboxylic acid, the alicyclic dicarboxylic acid and their derivatives. It is more preferable to adjust the raw material composition ratio to 1.01 to 1.08. Controlling a/b to this range adequately maintains the mole balance of the raw materials and thus easily achieves a high degree of polymerization.

The larger water content in the above mixture and the higher temperature accelerate the cyclization reaction of (A) pentamethylene diamine and increases the amount of production of a monofunctional amine (piperidine) working as the polymerization terminator. For this reason, the embodiment of the invention controls the water content in the above mixture to be not larger than 30% by weight and heats the mixture under pressure at the temperature condition of not lower than 200° C. Heating the mixture having the water content of larger than 30% by weight under pressure at the temperature condition of not lower than 200° C. increases the amount of production of piperidine and leads to difficulty in production of a crystalline polyamide resin having a high degree of polymerization. The water content in the above mixture is preferably not larger than 25% by weight. The water content in the mixture before being heated to or above 200° C. is not specifically limited. For example, a mixture having the water content of larger than 30% by weight may be produced and may be heated to or above 200° C. under pressure after concentration to the water content of not larger than 30% by weight at the temperature of lower than 200° C. The water content in the above mixture is also preferably not less than 5% by weight, is more preferably not less than 10% by weight and is most preferably not less than 15% by weight. Controlling the water content to be not less than 5% by weight enables the raw materials to be dissolved in an earlier stage after a start of polymerization and thereby facilitates homogeneous polymerization.

The crystalline polyamide resin produced according to the embodiment of the invention has the excellent crystallinity because of the use of highly symmetrical pentamethylene diamine with no substituent group in its side chain and has the limited molecular motion by the effect of the rigid aromatic and alicyclic dicarboxylic acids. Accordingly there is a possibility that the crystalline polyamide resin precipitates in a temperature range of not higher than the melting point in the course of polymerization. For this reason, in terms of suppressing volatilization of water working as the plasticizer to interfere with polymer precipitation in the course of polymerization in addition to suppressing volatilization of the raw materials to maintain the mole balance of the raw materials as described above, the embodiment of the invention causes distillation of water under the pressure condition of not less than 1.8 MPa. When the pressure of less than 1.8 MPa is employed as the pressure condition under application of heat and pressure, polymer may precipitate in the course of polymerization. The pressure condition under application of heat and pressure is preferably not less than 2.0 MPa. The higher pressure condition under application of heat and pressure is, on the other hand, likely to increase the production of piperidine. The embodiment of the invention accordingly causes distillation of water under application of heat and pressure of not higher than 3.5 MPa. The pressure condition of higher than 3.5 MPa under application of heat and pressure increases the production of piperidine and leads to difficulty in obtaining a crystalline polyamide resin having a high degree of polymerization. The pressure condition under application of heat and pressure is preferably not higher than 3.0 MPa, is more preferably not higher than 2.8 MPa and is furthermore preferably not higher than 2.7 MPa.

Polymerization of the polyamide resin is an equilibrium reaction, and the polymerization is accelerated at the temperature of not lower than 200° C. The embodiment of the invention accordingly causes distillation of water at the temperature of not lower than 200° C.

The production method subsequently includes a second step that releases the pressure to the atmospheric pressure level. The production of piperidine also depends on the temperature at the start of pressure relief from the high pressure state described above. The higher temperature at the start of pressure relief facilitates production of piperidine. The higher temperature at the start of pressure relief also more effectively suppresses polymer precipitation in the course of polymerization. According to the embodiment of the invention, in order to reduce the production of piperidine, the temperature at the start of pressure relief is preferably not higher than 295° C. and is more preferably not higher than 290° C. The temperature at the start of pressure relief may, however, be higher than 295° C. It is, on the other hand, preferable that the temperature at the start of pressure relief is not lower than the ((melting point of the resulting crystalline polyamide resin)−40° C.). Controlling the temperature at the start of pressure relief to be not lower than the ((melting point of the resulting crystalline polyamide resin)−40° C.) suppresses polymer precipitation in the course of polymerization. The temperature at the start of pressure relief may, however, be lower than the ((melting point of the resulting crystalline polyamide resin)−40° C.).

It is additionally preferable that the temperature at the end of pressure relief is not lower than the melting point of the resulting crystalline polyamide resin. Controlling the temperature at the end of pressure relief to be not lower than the melting point of the resulting crystalline polyamide resin suppresses polymer precipitation at the end of pressure relief.

The production method subsequently includes a third step that performs high-degree melt polymerization at a temperature of not lower than the melting point of the resulting crystalline polyamide resin until a relative viscosity reaches between 1.8 and 3.5, so as to obtain the crystalline polyamide resin. The relative viscosity herein means a relative viscosity at 25° C. of a 0.01 g/mL 98% sulfuric acid solution. In terms of suppressing polymer degradation by oxygen, high polymerization is preferably performed under an inert gas atmosphere or under reduced pressure.

The embodiment of the invention may add a polymerization accelerator if needed in any step at the stage of feeding the raw materials, at the end of pressure control and at the stage of high-degree melt polymerization. As the polymerization accelerator, preferable are inorganic phosphorus compounds, for example, phosphoric acid, phosphorous acid, hypophosphorous acid, pyrophosphoric acid, polyphosphoric acid, their alkali metal salts and their alkaline earth metal salts. Especially preferably used are sodium phosphite and sodium hypophosphite. It is preferable to use the polymerization accelerator in the range of 0.001 parts by weight to 1 part by weight relative to 100 parts by weight of the raw materials constituting the crystalline polyamide resin. Controlling the used amount of the polymerization accelerator to be not less than 0.001 parts by weight ensures the significant effect by its addition, while controlling the used amount of the polymerization accelerator to be not more than 1 part by weight maintains the high melt moldability of the resulting crystalline polyamide resin.

The crystalline polyamide resin produced according to the embodiment of the invention has the relative viscosity of 1.8 to 3.5. The relative viscosity of less than 1.8 reduces the toughness of the resulting crystalline polyamide resin. The relative viscosity is preferably not less than 1.9 and is more preferably not less than 2.0. The relative viscosity of greater than 3.5, on the other hand, leads to the excessively high melt viscosity and reduces the molding processability. The relative viscosity is preferably not greater than 3.0 and is more preferably not greater than 2.8. The procedure of controlling the relative viscosity to 1.8 to 3.5, for example, synthesizes an oligomer under the specific pressure condition described above and keeps the synthesized oligomer under reduced pressure or under an inert gas atmosphere at the temperature of not lower than the melting point of the resulting crystalline polyamide resin.

The crystalline polyamide resin with the relative viscosity of 1.8 to 3.5 obtained according to the embodiment of the invention may further be subjected to solid phase polymerization under reduced pressure or under an inert gas atmosphere at the temperature of not lower than 100° C. but lower than the melting point.

Additionally, the melting point of the crystalline polyamide resin is preferably not lower than 270° C. This further improves the heat resistance of the crystalline polyamide resin. The melting point herein means the temperature of an endothermic peak detected when the temperature is decreased from the molten state to 30° C. at a temperature decrease rate of 20° C./minute and is subsequently increased at a temperature increase rate of 20° C./minute under an inert gas atmosphere by using a differential scanning calorimeter.

The melting point of the crystalline polyamide resin is more preferably not lower than 275° C. In the case of detection of two or more endothermic peaks, the peak having the highest intensity is specified as the melting point. The melting point of the crystalline polyamide resin may, however, be lower than 270° C.

It is also preferable that the crystalline polyamide resin has the heat of fusion of not less than 30 J/g. This further improves the crystallinity of the crystalline polyamide resin. The heat of fusion herein means the area of an endothermic peak detected under the above conditions by using a differential scanning calorimeter. The heat of fusion is defined as an area surrounded by connecting (melting point−45° C.) with (melting point+20° C.) on a DSC curve. The heat of fusion of the crystalline polyamide resin is more preferably not less than 35 J/g and is furthermore preferably not less than 40 J/g. The heat of fusion of the crystalline polyamide resin may, however, be less than 30 J/g.

The crystalline polyamide resin produced by the one-step melt polymerization process according to the embodiment of the invention has the lower degree of dispersion (weight-average molecular weight/number-average molecular weight) measured by gel permeation chromatography, compared with a crystalline polyamide resin produced by solid phase polymerization after prepolymerization (two-step polymerization process). The crystalline polyamide resin according to the embodiment of the invention has the above degree of dispersion that is not higher than 3.5. The above degree of dispersion is more preferably not higher than 3.2, is furthermore preferably not higher than 3.0 and is most preferably not higher than 2.8. Compared with the solid phase polymerization process having non-uniform heat transfer, the one-step melt polymerization process having uniform heat transfer enables homogeneous polymerization. This accordingly enables the high polymerization reaction to proceed uniformly and is expected to give a crystalline polyamide resin having a low degree of dispersion. The degree of dispersion that is not higher than 3.5 results in the relatively lower ratio of the low molecular weight component, thus reducing gas emission during the molding process and enabling improving in strength and toughness of a molded product.

The degree of dispersion of the crystalline polyamide resin herein may be calculated by dissolving the crystalline polyamide resin in hexafluoroisopropanol with sodium trifluoroacetate added to 0.005 N and measuring the number-average molecular weight and the weight-average molecular weight by using gel permeation chromatography (GPC).

The production method of the crystalline polyamide resin according to the embodiment of the invention is an effective method for producing the polyamide resin having the excellent crystallinity and enables the polyamide resin having the heat of fusion of not less than 30 J/g measured by the above method to be produced by the one-step melt polymerization process. The heat of fusion of the crystalline polyamide resin is more preferably not less than 35 J/g and is furthermore preferably not less than 40 J/g. A linear diamine component is preferably used, in order to obtain the polyamide resin with high crystallinity.

Piperidine produced by the cyclization reaction of pentamethylene diamine works as the polymerization terminator and slow the rate of polymerization. The content of piperidine included in the crystalline polyamide resin is thus preferably not higher than $10.0 \times 10^{-5}$ mol/g, is more preferably not higher than $8.0 \times 10^{-5}$ mol/g and is furthermore preferably not higher than $7.0 \times 10^{-5}$ mol/g. Controlling the content of piperidine to be not higher than $10.0 \times 10^{-5}$ mol/g ensures the sufficient reactive terminal groups for high polymerization. The method of controlling the content of piperidine to this range may be, for example, a procedure of controlling the temperature at the start of pressure relief to be not higher than 290° C. and controlling the maximum pressure to be not higher than 2.7 MPa or a procedure of controlling the water content in the mixture to be not larger than 30% by weight and heating the mixture under pressure. The content of piperidine included in the crystalline polyamide resin may, however, be higher than $10.0 \times 10^{-5}$ mol/g.

The content of piperidine included in the crystalline polyamide resin may be determined using gas chromatography by creating calibration curves from piperidine standard solutions and subsequently measuring a treated solution obtained by hydrolysis of the crystalline polyamide resin.

Additionally, the crystalline polyamide resin obtained according to the embodiment of the invention has the excellent melt retention stability. It is preferable that the ratio B/A is not less than 0.7 and not greater than 1.5, wherein B represents a relative viscosity in sulfuric acid after melt retention of the crystalline polyamide resin at the (melting point+20° C.) for 30 minutes and A represents a relative viscosity in sulfuric acid before the retention. The ratio B/A of not less than 0.7 reduces degradation and coloring of the crystalline polyamide resin during melt processing, for example, during molding. The ratio B/A is preferably not less than 0.8 and is more preferably not less than 0.9. The ratio B/A of not more than 1.5, on the other hand, ensures the excellent molding processability. The ratio B/A is preferably not more than 1.3 and is more preferably not more than 1.2.

The crystalline polyamide resin according to the embodiment of the invention may be mixed with an inorganic filler and another polymer to be used as a crystalline polyamide resin composition. The inorganic filler may be any known inorganic filler generally used as the filler for resin. Available examples include glass fibers, carbon fibers, potassium titanate whiskers, zinc oxide whiskers, aluminum borate whiskers, alumina fibers, silicon carbide fibers, ceramic fibers, asbestos fibers, gypsum fibers, metal fibers, wollastonite, zeolite, sericite, kaolin, mica, talc, clay, pyrophyllite, bentonite, montmorillonite, hectorite, synthetic mica, asbestos, aluminosilicate, alumina, silicon oxide, magnesium oxide, zirconium oxide, titanium oxide, iron oxide, calcium carbonate, magnesium carbonate, dolomite, calcium sulfate, barium sulfate, magnesium hydroxide, calcium hydroxide, aluminum hydroxide, glass beads, ceramic beads, boron nitride, silicon carbide and silica. These inorganic fillers may be hollow, and two or more of these inorganic fillers may be used. The swelling layered silicate such as bentonite, montmorillonite, hectorite or synthetic mica may be used without any treatment or may be used in the form of an organic layered silicate obtained by cation exchange of the interlayer ion with organic ammonium ion. In order to reinforce the crystalline polyamide resin, among the above inorganic fillers, glass fibers and carbon fibers are especially preferable. In order to provide a crystalline polyamide resin composition having excellent surface appearance, it is preferable that the inorganic filler has the average particle size of 0.05 to 3 μm. The average particle size of not less than 0.05 μm provides a crystalline polyamide resin composition having excellent melt processability. The average particle size of not larger than 3 μm, on the other hand, provides a molded product having excellent surface appearance. The average particle diameter is measured by the precipitation method. In order to satisfy both reinforcement and the good surface appearance of the crystalline polyamide resin, it is preferable to use talc, kaolin, wollastonite or the swelling layered silicate as the inorganic filler.

In terms of obtaining the better mechanical strength, it is preferable to use the inorganic filler pretreated with a coupling agent, such as an isocyanate compound, an organosilane compound, an organotitanate compound, an organoborane compound or an epoxy compound. The organosilane compound is especially preferable as the coupling agent. Specific examples of the organosilane compound include: epoxy group-containing alkoxysilane compounds such as γ-glycidoxypropyltrimethoxysilane, γ-glycidoxypropyltriethoxysilane and β-(3,4-epoxycyclohexyl)ethyltrimethoxysilane; mercapto group-containing alkoxysilane compounds such as γ-mercaptopropyltrimethoxysilane and γ-mercaptopropyltriethoxysilane; ureido group-containing alkoxysilane compounds such as γ-ureidopropyltriethoxysilane, γ-ureidopropyltrimethoxysilane and γ-(2-ureidoethyl)aminopropyltrimethoxysilane; isocyanato group-containing alkoxysilane compounds such as γ-isocyanatopropyltriethoxysilane, γ-isocyanatopropyltrimethoxysilane, γ-isocyanatopropylmethyldimethoxysilane, γ-isocyanatopropylmethyldiethoxysilane, γ-isocyanatopropylethyldimethoxysilane, γ-isocyanatopropylethyldiethoxysilane and γ-isocyanatopropyltrichlorosilane; amino group-containing alkoxysilane compounds such as γ-(2-aminoethypaminopropylmethyldimethoxysilane, γ-(2-aminoethypaminopropyltrimethoxysilane and γ-aminopropyltrimethoxysilane; hydroxy group-containing alkoxysilane compounds such as γ-hydroxypropyltrimethoxysilane and γ-hydroxypropyltriethoxysilane; carbon-carbon unsaturated group-containing alkoxysilane compounds such as γ-methacryloxypropyltrimethoxysilane, vinyltrimethoxysilane and N-β-(N-vinylbenzylaminoethyl)-γ-aminopropyltrimethoxysilane hydrochloride; and acid anhydride group-containing alkoxysilane compounds such as 3-trimethoxysilylpropyl succinic anhydride. Especially preferably used are γ-methacryloxypropyltrimethoxysilane, γ-(2-aminoethypaminopropylmethyldimethoxysilane, γ-(2-aminoethypaminopropyltrimethoxysilane, γ-aminopropyltrimethoxysilane and 3-trimethoxysilylpropyl succinic anhydride. It is preferable to perform preliminary surface treatment of the filler with these coupling agents according to a conventional method and subsequently melt-knead the surface treated-filler with the crystalline polyamide resin. Another method called integral blend method may alternatively be employed, which adds these coupling agents in the process of melt kneading the filler with the crystalline polyamide resin without performing preliminary surface treatment of the filler.

The amount of these coupling agents used for treatment is preferably 0.5 to 3 parts by weight relative to 100 parts by weight of the inorganic filler. The amount of not less than 0.5 parts by weight ensures a significant effect on improvement in mechanical properties by treatment with the coupling agent. The amount of not more than 3 parts by weight, on the other hand, suppresses aggregation and poor dispersion of the inorganic filler.

The amount of the above inorganic filler to be added is preferably 0.1 to 200 parts by weight relative to 100 parts by weight of the crystalline polyamide resin. The amount of not less than 0.1 parts by weight further improves the rigidity and the strength. The amount of not more than 200 parts by weight, on the other hand, facilitates homogeneous dispersion in the crystalline polyamide resin.

The crystalline polyamide resin produced according to the embodiment of the invention may be mixed with another polymer. Available examples of another polymer include other polyamides, polyethylenes, polypropylenes, polyesters, polycarbonates, polyphenylene ethers, polyphenylene sulfides, liquid crystal polymers, polysulfones, polyethersulfones, ABS resins, SAN resins and polystyrenes. In order to improve the impact resistance of the crystalline polyamide resin according to the embodiment of the invention, an impact modifier, such as a modified polyolefin like a (co) polymer obtained by polymerization of an olefin compound and/or a conjugated diene compound, a polyamide elastomer or a polyester elastomer, is used preferably.

Examples of the above (co)polymer include ethylene copolymers, conjugated diene polymers and conjugated diene/aromatic vinyl hydrocarbon copolymers. The ethylene copolymers herein mean copolymers and multicomponent copolymers of ethylene and another monomer. Another monomer copolymerized with ethylene may be selected among α-olefins containing 3 or more carbon atoms, unconjugated dienes, vinyl acetate, vinyl alcohol and α,β-unsaturated carboxylic acids and their derivatives.

Examples of the α-olefins containing 3 or more carbon atoms include propylene, butene-1, penten-1,3-methylpentene-1 and octacene-1, and propylene and butene-1 are preferably used. Examples of the unconjugated dienes include: norbornene compounds such as 5-methylidene-2-norbornene, 5-ethylidene-2-norbornene, 5-vinyl-2-norbornene, 5-propenyl-2-norbornene, 5-isopropenyl-2-norbornene, 5-crotyl-2-norbornene, 5-(2-methyl-2-butenyl)-2-norbornene, 5-(2-ethyl-2-butenyl)-2-norbornene and 5-methyl-5-vinylnorbornene; dicyclopentadiene, methyltetrahydroindene, 4,7,8,9-tetrahydroindene, 1,5-cyclooctadiene, 1,4-hexadiene, isoprene, 6-methyl-1,5-heptadiene and 11-tridecadiene. Preferable are 5-methylidene-2-norbornene, 5-ethylidene-2-norbornene, dicyclopentadiene and 1,4-hexadiene. Examples of the α,β-unsaturated carboxylic acids include acrylic acid, methacrylic acid, ethacrylic acid, crotonic acid, maleic acid, fumaric acid, itaconic acid, citraconic acid and butenedicarboxylic acid. Examples of their derivatives include alkyl esters, allyl esters, glycidyl esters, acid anhydrides and imides.

The conjugated diene polymer means a polymer having at least one conjugated diene as its structural component and includes, for example, homopolymers such as 1,3-butadiene and copolymers of one or more monomers selected among 1,3-butadiene, isoprene (2-methyl-1,3-butadiene), 2,3-dimethyl-1,3-butadiene and 1,3-pentadiene. These polymers having part or all of the unsaturated bonds reduced by hydrogenation are also preferably used.

The conjugated diene/aromatic vinyl hydrocarbon copolymer is a block copolymer or a random copolymer of a conjugated diene and an aromatic vinyl hydrocarbon. Examples of the conjugated diene constituting the conjugated diene/aromatic vinyl hydrocarbon copolymer include the monomers described above; 1,3-butadiene and isoprene are especially preferable. Examples of the aromatic vinyl hydrocarbon include styrene, α-methylstyrene, o-methylstyrene, p-methylstyrene, 1,3-dimethylstyrene and vinylnaphthalene; styrene is especially preferably used. The conjugated diene/aromatic vinyl hydrocarbon copolymers having part or all of the unsaturated bonds other than double bonds of the aromatic rings reduced by hydrogenation are also preferably used.

Two or more of these impact modifiers may be used in combination.

Specific examples of the above (co)polymers usable as the impact modifier include ethylene/propylene copolymers, ethylene/butene-1 copolymers, ethylene/hexene-1 copolymers, ethylene/propylene/dicyclopentadiene copolymers, ethylene/propylene/5-ethylidene-2-norbornene copolymers, non-hydrogenated or hydrogenated styrene/isoprene/styrene triblock copolymers, non-hydrogenated or hydrogenated styrene/butadiene/styrene triblock copolymers, ethylene/ methacrylic acid copolymers and those having part or all of the carboxylic acid moieties of these copolymers changed to sodium, lithium, potassium, zinc and calcium salts, ethylene/methyl acrylate copolymers, ethylene/ethyl acrylate copolymers, ethylene/methyl methacrylate copolymers, ethylene/ethyl methacrylate copolymers, ethylene/ethyl acrylate-g-maleic anhydride copolymers (wherein "g" represents graft; the same shall apply hereafter), ethylene/methyl methacrylate-g-maleic anhydride copolymers, ethylene/ethyl acrylate-g-maleimide copolymers, ethylene/ethyl acrylate-g-N-phenyl maleimide copolymers and partially saponified substances of these copolymers, ethylene/glycidyl methacrylate copolymers, ethylene/vinyl acetate/glycidyl methacrylate copolymers, ethylene/methyl methacrylate/glycidyl methacrylate copolymers, ethylene/glycidyl acrylate copolymers, ethylene/vinyl acetate/glycidyl acrylate copolymers, ethylene/glycidyl ether copolymers, ethylene/propylene-g-maleic anhydride copolymers, ethylene/butene-1-g-maleic anhydride copolymers, ethylene/propylene/1,4-hexadiene-g-maleic anhydride copolymers, ethylene/propylene/dicyclopentadiene-g-maleic anhydride copolymers, ethylene/propylene/2,5-norbornadiene-g-maleic anhydride copolymers, ethylene/propylene-g-N-phenyl maleimide copolymers, ethylene/butene-1-g-N-phenyl maleimide copolymers, hydrogenated styrene/butadiene/styrene-g-maleic anhydride copolymers, hydrogenated styrene/isoprene/styrene-g-maleic anhydride copolymers, ethylene/propylene-g-glycidyl methacrylate copolymers, ethylene/butene-1-g-glycidyl methacrylate copolymers, ethylene/propylene/1,4-hexadiene-g-glycidyl methacrylate copolymers, ethylene/propylene/dicyclopentadiene-g-glycidyl methacrylate copolymers, hydrogenated styrene/butadiene/styrene-g-glycidyl methacrylate copolymers, nylon 12/polytetramethylene glycol copolymers, nylon 12/polytrimethylene glycol copolymers, polybutylene terephthalate/polytetramethylene glycol copolymers and polybutylene terephthalate/polytrimethylene glycol copolymers. Among them, ethylene/methacrylic acid copolymers and those having part or all of the carboxylic acid moieties of these copolymers changed to sodium, lithium, potassium, zinc and calcium salts, ethylene/propylene-g-maleic anhydride copolymers, ethylene/butene-1-g-maleic anhydride copolymers and hydrogenated styrene/butadiene/styrene-g-maleic anhydride copolymers are more preferable. Among them, especially preferable are ethylene/methacrylic acid copolymers and those having part or all of the carboxylic acid moieties of these copolymers changed to sodium, lithium, potassium, zinc and calcium salts, ethylene/propylene-g-maleic anhydride copolymers and ethylene/butene-1-g-maleic anhydride copolymers.

The amount of the impact modifier to be added to the crystalline polyamide resin produced according to the embodiment of the invention is preferably 5 to 100 parts by weight relative to 100 parts by weight of the crystalline polyamide resin. The above amount of not less than 5 parts by weight ensures the sufficient effect on improvement in impact resistance. The above amount of not greater than 100 parts by weight, on the other hand, provides the excellent molding processability.

The method for preparing the above crystalline polyamide resin composition is not specifically limited, but a specific example of the applicable procedure may supply and melt-knead the raw materials, i.e., the crystalline polyamide resin, the inorganic filler and/or another polymer in a known melt kneading machine, such as a single-screw extruder or a twin-screw extruder, a Banbury mixer, a kneader or a mixing roll.

In the case of using a melt kneading machine, an effective method for homogeneously dispersing the inorganic filler and another polymer in the crystalline polyamide resin is to control the ratio L/D (screw length/screw diameter) of the kneading machine, the presence or the absence of a vent, the kneading temperature, the retention time, the position where each of the components is added, and the added amount of each component. The longer L/D of the melt kneading machine and the longer retention time are generally preferable to accelerate the homogeneous dispersion of the inorganic filler and another polymer. When glass fibers are used as the inorganic filler, however, these conditions may lead to breakage of glass fibers and deterioration of the strength of the polyamide resin composition. It is accordingly preferable to set up the conditions according to the raw materials used. The crystalline polyamide resin produced according to the embodiment of the invention has a high melting point, so that reduction in heat history is preferable in terms of suppressing a decrease in molecular weight due to thermal decomposition during the melt kneading process.

Additionally, any of various additives may be added to the crystalline polyamide resin produced according to the embodiment of the invention at any arbitrary timing in such a range that does not interfere with the effects of the invention. The various additives include, for example, antioxidants, thermal stabilizers (e.g., hindered phenol series, hydroquinone series, phosphite series and their substitution products and copper compounds), weathering agents (e.g., resorcinol series, salicylate series, benzotriazole series, benzophenone series and hindered amine series), mold release agents, lubricants (e.g., aliphatic alcohols, aliphatic amides, aliphatic bisamides, bisurea and polyethylene waxes), pigments (e.g., cadmium sulfide, phthalocyanine and carbon black), dyes (e.g., nigrosine and aniline black), plasticizers (e.g., octyl p-oxybenzoate and N-butylbenzene sulfonamide), antistatic agents (e.g., alkyl sulfate-type anionic antistatic agents, quaternary ammonium salt-type cationic antistatic agents, non-ionic antistatic agents like polyoxyethylene sorbitan monostearate and betaine-type amphoteric antistatic agents) and flame retardants (e.g., melamine cyanurate, hydroxides such as magnesium hydroxide and aluminum hydroxide, phosphorus-based flame retardants such as ammonium polyphosphate, melamine polyphosphate and metal salts of phosphinic acid, brominated polystyrene, brominated polyphenylene oxide, brominated polycarbonate, brominated epoxy resin and combinations of these brominated flame retardants and antimony trioxide).

The antioxidant may be, for example, a phenolic compound, a sulfur compound or a phosphorus compound.

Examples of the phenolic antioxidant include 2,4-dimethyl-6-t-butylphenol, 2,6-di-t-butylphenol, 2,6-di-t-butyl-p-cresol, 2,6-di-t-butyl-4-ethylphenol, 4,4'-butylidene-bis(6-t-butyl-3-methylphenol), 2,2'-methylene-bis(4-methyl-6-t-butylphenol), 2,2'-methylene-bis(4-ethyl-6-t-butylphenol), octadecyl-3-(3',5'-di-t-butyl-4'-hydroxyphenyl)propionate, tetrakis[methylene-3-(3,5-di-t-butyl-4-hydroxyphenyl) propionate]methane, 1,1,3-tris(2-methyl-4-hydroxy-5-di-t-butylphenyl)butane, tris(3,5-di-t-butyl-4-hydroxybenzyl) isocyanurate, triethylene glycol-bis[3-(3-t-butyl-5-methyl-4-hydroxyphenyl) propionate], 1,6-hexanediol-bis[3-(3,5-di-t-butyl-4-hydroxyphenyl) propionate], 2,4-bis-(n-octylthio)-6-(4-hydroxy-3,5-di-t-butylanilino)-1,3,5-triazine, 2,2-thiodiethylene-bis[3-(3,5-di-t-butyl-4-hydroxyphenyl)

propionate], N,N'-hexamethylene-bis(3,5-di-t-butyl-4-hydroxyhydrocinnamide), diethyl 3,5-di-t-butyl-4-hydroxybenzyl phosphonate 1,3,5-trimethyl-2,4,6-tris(3,5-di-t-butyl-4-hydroxybenzyl)benzene, 2,4-bis[(octylthio)methyl]-o-cresol and isooctyl-3-(3,5-di-t-butyl-4-hydroxyphenyl) propionate.

Examples of the sulfur antioxidant include dilauryl thiodipropionate, dimyristyl thiodipropionate, distearyl thiodipropionate, ditridecyl thiodipropionate, pentaerythrityl(3-lauryl thiopropionate) and 2-mercaptobenzimidazole.

Examples of the phosphorus antioxidant include bis(2,6-di-t-butyl-4-methylphenyl)pentaerythritol diphosphite, bis(2,4-di-t-butylphenyl)pentaerythritol diphosphite, bis(2,4-di-cumylphenyl)pentaerythritol diphosphite, tris(2,4-di-t-butylphenyl) phosphite, tetrakis(2,4-di-t-butylphenyl)-4,4'-bisphenylene phosphite, distearyl pentaerythritol diphosphite, triphenyl phosphite and diethyl 3,5-di-butyl-4-hydroxybenzyl phosphonate.

Any of these antioxidants may be used alone or may be used in combination since a combination of two or more may have synergetic effects.

Specific examples of the copper compound used as the thermal stabilizer include copper (I) chloride, copper (II) chloride, copper (I) bromide, copper (II) bromide, copper (I) iodide, copper (II) iodide, copper (II) sulfate, copper (II) nitrate, copper phosphate, copper (I) acetate, copper (II) acetate, copper (II) salicylate, copper (II) stearate, copper (II) benzoate and copper compounds of the above inorganic copper halides and, for example, xylylene diamine, 2-mercaptobenzimidazole and benzimidazole. Among them, monovalent copper halide compounds are preferable; copper (I) acetate and copper(I) iodide are specified as especially preferable copper compounds. It is possible to add an alkali halide in combination with the copper compound. Examples of the alkali halide include lithium chloride, lithium bromide, lithium iodide, potassium chloride, potassium bromide, potassium iodide, sodium bromide and sodium iodide. Especially preferable are potassium iodide and sodium iodide.

The crystalline polyamide resin or the crystalline polyamide resin composition including the inorganic filler and another polymer produced according to the embodiment of the invention may be molded by any arbitrary molding technique, such as injection molding, extrusion molding, blow molding, vacuum molding, melt spinning or film forming. These resin molded produces may be formed in desired shapes to be used, for example, as automobile parts and machine parts. More specifically, these resin molded products are effectively used in various applications: for example, automobile engine cooling water system parts or more specifically parts used in contact with cooling water in the automobile engine room, such as radiator tank parts including top and base parts of radiator tanks, coolant reserve tanks, water pipes, water pump housings, water pump impellers, valves and other water pump parts; electric and electronic-related parts, automobile and vehicle-related parts, household and office electric appliance-related parts, computer-related parts, facsimile and copying machine-related parts and machine-related parts, such as switches, subminiature slide switches, DIP switches, switch housings, lamp sockets, banding bands, connectors, connector housings, connector shells, IC sockets, coil bobbins, bobbin covers, relays, relay boxes, capacitor cases, internal motor parts, compact motor cases, gear and cams, dancing pulleys, spacers, insulators, fasteners, buckles, wire clips, bicycle wheels, casters, helmets, terminal blocks, power tool housings, starter insulator parts, spoilers, canisters, radiator tanks, chamber tanks, reservoir tanks, fuse boxes, air cleaner cases, air-conditioner fans, terminal housings, wheel covers, intake and exhaust pipes, bearing retainers, cylinder head covers, intake manifolds, water pipe impellers, clutch releases, speaker diaphragms, heat-resistant containers, microwave oven parts, rice cooker parts, and printer ribbon guides.

EXAMPLES

The properties of the polyamide resins used in the respective examples and comparative examples were evaluated by the following methods.

[Discharge Rate]

The ratio of the yield actually discharged from a polymerization apparatus to the theoretical yield on the assumption that the polyamide resin raw material was fully polymerized was determined as the discharge rate.

[Relative Viscosity ($\eta r$)]

The relative viscosity of the polyamide resin was measured at the concentration of 0.01 g/mL in 98% sulfuric acid at 25° C. by using an Ostwald viscometer.

[Melting Point (Tm) and Heat of Fusion ($\Delta$Hm)]

By using a robot DSC RDC 220 manufactured by Seiko Instruments Inc., about 5 mg of the polyamide resin was accurately weighed and was subjected to measurement in a nitrogen atmosphere under the following conditions. The polyamide resin was heated to (temperature ($T_o$) of an endothermic peak+35° C.) to be in the molten state, wherein the endothermic peak was observed when the temperature was increased from 30° C. at a temperature increase rate of 20° C./minute. The temperature was then decreased to 30° C. at a temperature decrease rate of 20° C./minute and was kept at 30° C. for 3 minutes. The temperature (melting point: Tm) and the area (heat of fusion: $\Delta$Hm) of an endothermic peak was determined, wherein the endothermic peak was observed when the temperature was subsequently increased to $T_o$+35° C. at a temperature increase rate of 20° C./minute. The area herein is defined as an area surrounded by connecting (Tm−45° C.) with (Tm+20° C.) on a DSC curve.

[Content of piperidine or 3-methylpiperidine]

About 0.06 g of the polyamide resin was accurately weighed and was subjected to hydrolysis in a hydrobromic acid aqueous solution at 150° C. for 3 hours. The treated solution was alkalified by addition of a 40% sodium hydroxide aqueous solution. After that, toluene and ethyl chloroformate were subsequently added to the solution, and the solution mixture was stirred. A supernatant toluene solution was extracted as a measurement solution. A piperidine standard solution or a 3-methyl piperidine standard solution was used for quantitative analysis. The following conditions were employed as measurement conditions:

Instrument: GC-14A manufactured by SHIMADZU CORPORATION
Column: NB-1 (manufactured by GL Sciences Inc.) 60 m×0.25 mm
Detector: FID (flame ionization detector)
Oven temperature: increasing from 150° C. to 330° C. at a rate of 10° C./minute
Sample inlet temperature: 250° C.
Detector temperature: 330° C.
Carrier gas: He
Sample injection volume: 3.0 µL

[Number Average Molecular Weight (Mn), Weight Average Molecular Weight (Mw) and Degree of Dispersion (Mw/Mn)]

A solution obtained by dissolution of 2.5 mg of the polyamide resin in 4 mL of hexafluoroisopropanol (with 0.005 N sodium trifluoroacetate added) and subsequent filtration with a filter of 0.45 µm was subjected to measurement using gel permeation chromatography (GPC). The following conditions were employed as measurement conditions:
Instrument: e-Alliance GPC systems (e-alliance 2695XE separation module) (manufactured by Waters Corporation)
Detector: 2414 differential refractometer (manufactured by Waters Corporation)
Column: Shodex HFIP-806M (two columns)+HFIP-LG
Solvent: hexafluoroisopropanol (with 0.005 N sodium trifluoroacetate added)
Flow rate: 0.5 ml/minute
Sample injection volume: 0.1 mL
Temperature: 30° C.
Molecular weight calibration: polymethyl methacrylate

[Flexural Modulus]

A rod-shaped test piece of ½ inch (1.27 cm)×5 inch (12.7 cm)×¼ inch (0.635 cm) obtained by injection molding (SG75H-MIV manufactured by Sumitomo Heavy Industries, Ltd.; cylinder temperature: melting point+15° C.; mold temperature: 150° C.; injection pressure: lower limit pressure+0.5 MPa) was subjected to a flexural test according to ASTM-D790.

[Tensile Strength]

An ASTM No. 1 dumbbell obtained by injection molding (SG75H-MIV manufactured by Sumitomo Heavy Industries, Ltd.; cylinder temperature: melting point+15° C.; mold temperature: 150° C.; injection pressure: lower limit pressure+0.5 MPa) was subjected to a tensile test according to ASTM-D638.

Reference Example 1 (Preparation of Lysine Decarboxylase)

Lysine decarboxylase was prepared as described below, in order to produce pentamethylene diamine used for production of the polyamide resins of the respective examples and comparative examples. *E. coli* JM 109 strain was cultured by the following procedure. This strain was first inoculated with one platinum loop in 5 mL of an LB medium and was shaken at 30° C. for 24 hours for preculture. Then, 50 mL of the LB medium was placed into a 500 mL conical flask and preliminarily steam-sterilized at 115° C. for 10 minutes. The above precultured strain was then subcultured on this sterilized medium and was cultured under the conditions of the amplitude of 30 cm and at 180 rpm for 24 hours at pH adjusted to 6.0 with a 1 N hydrochloric acid aqueous solution. The resulting fungus bodies were collected, and a cell-free extract was prepared by ultrasonic grinding and centrifugation. The lysine decarboxylase activity of the cell-free extract was measured by a conventional method (Souda Kenji, Misono Haruo, Seikagaku jikken koza (biochemical experiment course) vol. 11-jo, page 179-191 (1976)). In the case of lysine substrate, there is a possibility of conversion by lysine monooxygenase, lysine oxydase and lysine mutase, which is expected to be intrinsically the main route in the lysine metabolic system of the above *E. coli* strain. For the purpose of blocking this reaction system, the cell-free extract of the *E. coli* JP 109 strain was heated at 75° C. for 5 minutes. This cell-free extract was then fractionated with 40% saturated ammonium sulfate and 55% saturated ammonium sulfate. By using the obtained crude lysine decarboxylase solution, pentamethylene diamine was produced from lysine.

Reference Example 2 (Production of Pentamethylene Diamine)

An aqueous solution was prepared to include 50 mM of lysine hydrochloride (manufactured by Wako Pure Chemical Industries, Ltd.), 0.1 mM of pyridoxal phosphate (manufactured by Wako Pure Chemical Industries, Ltd.) and 40 mg/L of crude lysine decarboxylase (produced in Reference Example 1). Pentamethylene diamine hydrochloride was obtained by reaction of 1000 mL of the aqueous solution at 45° C. for 48 hours at pH maintained at 5.5 to 6.5 with a 0.1 N hydrochloric acid aqueous solution. The pentamethylene diamine hydrochloride was converted to pentamethylene diamine by adding sodium hydroxide to this aqueous solution, was extracted with chloroform and was subjected to distillation under reduced pressure (10 mmHg, 60° C.). This yielded pentamethylene diamine. This pentamethylene diamine was detected to include no 2,3,4,5-tetrahydropyridine or piperidine as impurities.

Example 1

In a 30 L pressure vessel with a stirrer, 2.00 kg of pentamethylene diamine (Reference Example 2), 2.16 kg of hexamethylene diamine (manufactured by Tokyo Chemical Industry Co., Ltd.), 6.04 kg of terephthalic acid (manufactured by Mitsui Chemicals, Inc.), 4.3 g of sodium hypophosphite monohydrate (manufactured by Kanto Chemical Co., Inc.) and 3.3 kg of ion exchange water were supplied, were sealed and were subjected to nitrogen substitution. The mixture was heated with stirring. After the internal temperature reached 236° C. and the internal pressure reached 2.2 MPa, the internal pressure was maintained at 2.2 MPa for 124 minutes accompanied with distillation of water vapor. When the internal temperature reached 290° C., the internal pressure was released to the ordinary pressure over 90 minutes (internal temperature eventually reached 317° C.). Polymerization was then continued for 15 minutes under reduced pressure (40 kPa), so that a polyamide resin was obtained. The reaction proceeds in the closed system for a time period between the supply of the raw materials and the start of pressure relief, so that the water content at the time of application of heat and pressure is equal to the water content at the time of material supply. The maximum temperature during polymerization was 325° C.

Example 2

A polyamide resin was obtained by the same procedure as Example 1, except that the internal pressure was changed to 2.5 MPa. The temperature at the end of pressure relief was 328° C., and the maximum temperature was 334° C.

Example 3

A polyamide resin was obtained by the same procedure as Example 2, except that the temperature at the start of pressure relief was changed to 300° C. The temperature at the end of pressure relief was 319° C., and the maximum temperature was 325° C.

Example 4

A polyamide resin was obtained by the same procedure as Example 1, except that the internal pressure was changed to 2.0 MPa. The temperature at the end of pressure relief was 314° C., and the maximum temperature was 325° C.

Example 5

A polyamide resin was obtained by the same procedure as Example 1, except that the internal pressure was changed to 2.8 MPa. The temperature at the end of pressure relief was 317° C., and the maximum temperature was 328° C.

Comparative Example 1

A polyamide resin was obtained by the same procedure as Example 1, except that the internal pressure was changed to 1.7 MPa. The temperature at the end of pressure relief was 321° C., and the maximum temperature was 330° C.

Comparative Example 2

A polyamide resin was obtained by the same procedure as Example 1, except that the internal pressure was changed to 3.7 MPa. The temperature at the end of pressure relief was 320° C., and the maximum temperature was 329° C.

Comparative Example 3

A polyamide resin was obtained by the same procedure as Example 2, except that the amount of ion exchange water was changed to 10 kg. The temperature at the end of pressure relief was 323° C., and the maximum temperature was 330° C.

Comparative Example 4

In a 30 L pressure vessel with a stirrer, the same raw materials as those of Example 1 were supplied, were sealed and were subjected to nitrogen substitution. The mixture was heated with stirring. After the internal temperature reached 240° C. and the internal pressure reached 2.5 MPa, the internal pressure was maintained at 2.5 MPa for 120 minutes accompanied with distillation of water vapor (the internal temperature eventually reached 290° C.). The content was discharged from the reaction vessel onto a cooling belt. A low-degree condensation product obtained by vacuum drying this content at 120° C. for 24 hours was subjected to solid-phase polymerization at 240° C. under reduced pressure (40 Pa), so that a polyamide resin was obtained.

Comparative Example 5

In a 30 L pressure vessel with a stirrer, 2.16 kg of 2-methylpentamethylene diamine (manufactured by Tokyo Chemical Industry Co., Ltd.), 2.16 kg of hexamethylene diamine, 5.88 kg of terephthalic acid, 4.3 g of sodium hypophosphite monohydrate and 3.3 kg of ion exchange water as the raw materials were supplied, were sealed and were subjected to nitrogen substitution. The mixture was heated with stirring. After the internal temperature reached 226° C. and the internal pressure reached 1.7 MPa, the internal pressure was maintained at 1.7 MPa for 140 minutes accompanied with distillation of water vapor. When the internal temperature reached 290° C., the internal pressure was released to the ordinary pressure over 90 minutes (internal temperature eventually reached 321° C.). Polymerization was then continued for 15 minutes under reduced pressure (40 kPa), so that a polyamide resin was obtained. The maximum temperature during polymerization was 325° C.

Example 6

In a 3 L pressure vessel with a stirrer, 114 g of pentamethylene diamine, 242 g of diaminodecane (manufactured by Kokura Synthetic Industries, Ltd.), 407 g of terephthalic acid, 0.1655 g of sodium hypophosphite monohydrate and 250 g of ion exchange water were supplied, were sealed and were subjected to nitrogen substitution. The mixture was heated with stirring. After the internal temperature reached 243° C. and the internal pressure reached 2.5 MPa, the internal pressure was maintained at 2.5 MPa for 46 minutes accompanied with distillation of water vapor. When the internal temperature reached 275° C., the internal pressure was released to the ordinary pressure over 60 minutes (internal temperature eventually reached 310° C.). Polymerization was then continued for 15 minutes under a nitrogen atmosphere (0.5 L/min), so that a polyamide resin was obtained. The reaction proceeds in the closed system for a time period between the supply of the raw materials and the start of pressure relief, so that the water content at the time of application of heat and pressure is equal to the water content at the time of material supply. The maximum temperature during polymerization was 314° C.

Example 7

In a 3 L pressure vessel with a stirrer, 114 g of pentamethylene diamine, 260 g of diaminododecane (manufactured by Kokura Synthetic Industries, Ltd.), 390 g of terephthalic acid, 0.1664 g of sodium hypophosphite monohydrate and 250 g of ion exchange water were supplied, were sealed and were subjected to nitrogen substitution. The mixture was heated with stirring. After the internal temperature reached 243° C. and the internal pressure reached 2.5 MPa, the internal pressure was maintained at 2.5 MPa for 50 minutes accompanied with distillation of water vapor. When the internal temperature reached 270° C., the internal pressure was released to the ordinary pressure over 60 minutes (internal temperature eventually reached 300° C.). Polymerization was then continued for 15 minutes under a nitrogen atmosphere (0.5 L/min), so that a polyamide resin was obtained. The reaction proceeds in the closed system for a time period between the supply of the raw materials and the start of pressure relief, so that the water content at the time of application of heat and pressure is equal to the water content at the time of material supply. The maximum temperature during polymerization was 305° C.

Comparative Example 6

Polymerization was performed by the same procedure as that of Example 6, except that 123 g of hexamethylene diamine, 241 g of diaminodecane, 397 g of terephthalic acid, 0.1660 g of sodium hypophosphite monohydrate and 250 g of ion exchange water were used as the raw materials. In the course of polymerization, however, the polymer was gelated and could not thus be discharged. The temperature at the end of pressure relief was 294° C., and the maximum temperature was 303° C.

Comparative Example 7

Polymerization was performed by the same procedure as that of Example 7, except that 123 g of hexamethylene diamine, 260 g of diaminododecane, 381 g of terephthalic acid, 0.1669 g of sodium hypophosphite monohydrate and 250 g of ion exchange water were used as the raw materials. In the course of polymerization, however, the polymer was gelated and could not thus be discharged. The temperature at the end of pressure relief was 293° C., and the maximum temperature was 300° C.

Comparative Example 8

A polyamide resin was obtained by the same procedure as Example 6, except that the internal pressure was changed to 1.7 MPa. The temperature at the end of pressure relief was 305° C., and the maximum temperature was 308° C.

The conditions of manufacturing the polyamide resins of Examples 1 to 7 and Comparative Examples 1 to 8 and the measurement results of the respective polyamide resins are summarized in Tables 1 to 4 given below. Polycondensation of the diamine component and the dicarboxylic acid component herein is sequential polymerization. Since the polyamide resin of each Example has an increased relative viscosity which corresponds to the degree of polymerization, it is expected that the composition of the polyamide resin of each Example is substantially equivalent to the composition based on the feeding amounts of the raw materials.

TABLE 1

| Polymer Composition | | EX 1 | EX 2 | EX 3 | EX 4 |
|---|---|---|---|---|---|
| | | weight ratio | | | |
| | | 5T/6T = 50/50 | 5T/6T = 50/50 | 5T/6T = 50/50 | 5T/6T = 50/50 |
| Ratio of (A) to Gross Amount of Diamine Component | mol % | 51.3 | 51.3 | 51.3 | 51.3 |
| Ratio of (B) to Gross Amount of Dicarboxylic Acid Component | mol % | 100 | 100 | 100 | 100 |
| Water Content At Start of Application of Heat and Pressure | wt % | 24 | 24 | 24 | 24 |
| Pressure | MPa | 2.2 | 2.5 | 2.5 | 2.0 |
| Temperature at Start of Pressure Relief | ° C. | 290 | 290 | 300 | 290 |
| Temperature at End of Pressure Relief | ° C. | 317 | 328 | 319 | 314 |
| Maximum Temperature | ° C. | 325 | 334 | 325 | 325 |
| Discharge Rate | wt % | 95 | 93 | 95 | 85 |
| ηr | — | 2.0 | 2.2 | 1.8 | 2.0 |
| Piperidine | ×10⁻⁵ mol/g | 6.4 | 6.6 | 22 | 5.7 |
| Tm | ° C. | 309 | 311 | 308 | 308 |
| ΔHm | J/g | 41 | 38 | 36 | 39 |
| Mn | — | 10400 | 10100 | 6000 | 9450 |
| Mw | — | 27300 | 33900 | 20700 | 27400 |
| Mw/Mn | — | 2.63 | 3.36 | 3.45 | 2.90 |

5T: Structural unit consisting of pentamethylene diamine and terephthalic acid
6T: Structural unit consisting of hexamethylene diamine and terephthalic acid

TABLE 2

| Polymer Composition | | EX 5 | EX 6 | EX 7 |
|---|---|---|---|---|
| | | weight ratio | | |
| | | 5T/6T = 50/50 | 5T/10T = 40/60 | 5T/12T = 40/60 |
| Ratio of (A) to Gross Amount of Diamine Component | mol % | 51.3 | 44.4 | 46.3 |
| Ratio of (B) to Gross Amount of Dicarboxylic Acid Component | mol % | 100 | 100 | 100 |
| Water Content At Start of Application of Heat and Pressure | wt % | 24 | 25 | 25 |
| Pressure | MPa | 2.8 | 2.5 | 2.5 |
| Temperature at Start of Pressure Relief | ° C. | 290 | 275 | 270 |
| Temperature at End of Pressure Relief | ° C. | 317 | 310 | 300 |
| Maximum Temperature | ° C. | 328 | 314 | 305 |
| Discharge Rate | wt % | 95 | 92 | 95 |
| ηr | — | 1.8 | 2.8 | 2.5 |
| Piperidine | ×10⁻⁵ mol/g | 14 | 7.0 | 6.7 |
| Tm | ° C. | 307 | 278 | 273 |
| ΔHm | J/g | 38 | 40 | 32 |
| Mn | — | 6330 | 12800 | 11000 |
| Mw | — | 21000 | 38800 | 32700 |
| Mw/Mn | — | 3.32 | 3.03 | 2.97 |

5T: Structural unit consisting of pentamethylene diamine and terephthalic acid
6T: Structural unit consisting of hexamethylene diamine and terephthalic acid
10T: Structural unit consisting of decane diamine and terephthalic acid
12T: Structural unit consisting of dodecane diamine and terephthalic acid

TABLE 3

| Polymer Composition | | COMP EX 1 5T/6T = 50/50 weight ratio | COMP EX 2 5T/6T = 50/50 weight ratio | COMP EX 3 5T/6T = 50/50 weight ratio | COMP EX 4 5T/6T = 50/50 weight ratio |
|---|---|---|---|---|---|
| Ratio of (A) to Gross Amount of Diamine Component | mol % | 51.3 | 51.3 | 51.3 | 51.3 |
| Ratio of (B) to Gross Amount of Dicarboxylic Acid Component | mol % | 100 | 100 | 100 | 100 |
| Water Content At Start of Application of Heat and Pressure | wt % | 24 | 24 | 49 | 24 |
| Pressure | MPa | 1.7 | 3.7 | 2.5 | 2.5 |
| Temperature at Start of Pressure Relief | °C. | 290 | 290 | 290 | 290 |
| Temperature at End of Pressure Relief | °C. | 321 | 320 | 323 | — |
| Maximum Temperature | °C. | 330 | 329 | 330 | — |
| Discharge Rate | wt % | 10 | 98 | 99 | 99 |
| ηr | — | 1.7 | 1.4 | 1.4 | 2.1 (Solid phase polymerization) |
| Piperidine | ×10$^{-5}$ mol/g | 5.5 | 33 | 38 | 6.0 |
| Tm | °C. | 308 | 307 | 307 | 312 |
| ΔHm | J/g | 40 | 38 | 38 | 43 |
| Mn | — | 7280 | 4450 | 4490 | 7820 |
| Mw | — | 18700 | 7690 | 7400 | 31500 |
| Mw/Mn | — | 2.57 | 1.73 | 1.65 | 4.03 |

5T: Structural unit consisting of pentamethylene diamine and terephthalic acid
6T: Structural unit consisting of hexamethylene diamine and terephthalic acid

TABLE 4

| Polymer Composition | | COMP EX 5 M5T/6T = 50/50 weight ratio | COMP EX 6 6T/10T = 40/60 weight ratio | COMP EX 7 6T/12T = 40/60 weight ratio | COMP EX 8 5T/10T = 40/60 weight ratio |
|---|---|---|---|---|---|
| Ratio of (A) to Gross Amount of Diamine Component | mol % | 0 | 0 | 0 | 44.4 |
| Ratio of (B) to Gross Amount of Dicarboxylic Acid Component | mol % | 100 | 100 | 100 | 100 |
| Water Content At Start of Application of Heat and Pressure | wt % | 24 | 25 | 25 | 25 |
| Pressure | MPa | 1.7 | 2.5 | 2.5 | 1.7 |
| Temperature at Start of Pressure Relief | °C. | 290 | 275 | 270 | 275 |
| Temperature at End of Pressure Relief | °C. | 321 | 294 | 293 | 305 |
| Maximum Temperature | °C. | 325 | 303 | 300 | 308 |
| Discharge Rate | wt % | 95 | 0 | 0 | 13 |
| ηr | — | — | 2.1 | — | 1.6 |
| Piperidine | ×10$^{-5}$ mol/g | — | — | — | 6.2 |
| 3-Methyl piperidine | ×10$^{-5}$ mol/g | 5.7 | — | — | — |
| Tm | °C. | 303 | — | — | 276 |
| ΔHm | J/g | 28 | — | — | 41 |
| Mn | — | — | 10700 | — | 8370 |
| Mw | — | — | 31700 | — | 22600 |
| Mw/Mn | — | — | 2.96 | — | 2.70 |

M5T: Structural unit consisting of 2-methylpentamethylene diamine and terephthalic acid
6T: Structural unit consisting of hexamethylene diamine and terephthalic acid
10T: Structural unit consisting of decane diamine and terephthalic acid
12T: Structural unit consisting of dodecane diamine and terephthalic acid According to comparison between Examples 1 to 6 and Comparative Examples 1 and 8, it is concluded that the polymerization pressure is to be controlled to or above 1.8 MPa, in order to ensure 85% or a higher yield of the polyamide resin relative to the theoretical yield. In Comparative Examples 1 and 8, a temporary abrupt increase of the stirring torque was observed, while the internal pressure was maintained at 1.7 MPa. In Comparative Examples 1 and 8, it is accordingly estimated that about 90% of the polymer was not dischargeable since polymer precipitated in the state wound on the mixing blade in the course of polymerization.

According to comparison between Examples 1, 2, 4 and 5 and Comparative Example 2, it is shown that an increase in polymerization pressure leads to an increase in piperidine content in the polyamide resin and makes high polymerization of the polyamide resin difficult. It is accordingly concluded that the polymerization pressure is to be controlled to or below 3.5 MPa.

According to comparison between Examples 2 and 3, it is concluded that controlling the temperature at the start of pressure relief to or below 290° C. significantly reduces the piperidine content.

According to comparison between Examples 2 and Comparative Example 3, it is shown that an increase in water content in the raw materials leads to an increase in piperidine content when the raw materials are heated to or above 200° C. without concentration of the raw materials at the temperature of lower than 200° C. It is accordingly concluded that the water content in the raw materials is to be controlled to or below 30% by weight.

According to comparison between Examples 1 to 5 and Comparative Example 4, it is shown that the degree of dispersion (weight-average molecular weight/number-average molecular weight) representing a distribution of the molecular weight of the polyamide resin obtained by melt polymerization has the smaller value, which indicates the more homogeneous polymer, compared with that of the polyamide resin obtained by solid phase polymerization.

According to comparison between Examples 1 and 4, it is shown that Example 1 having the polymerization pressure of 2.2 MPa during distillation of water under application of heat and pressure has the higher discharge rate than that of Example 4 having the above pressure of 2.0 MPa. It is thus expected that an increase in polymerization pressure more effectively suppresses precipitation of polymer in the course of polymerization.

According to comparison between Comparative Examples 1 and 5, it is shown that 95% of the theoretical yield is dischargeable even under the polymerization pressure of 1.7 MPa when 2-methylpentamethylene diamine is used in place of pentamethylene diamine.

According to comparison between Examples 6 and 7 and Comparative Examples 6 and 7, it is showed that the polymer is gelated in the course of polymerization when hexamethylene diamine is used in place of pentamethylene diamine.

The following evaluation criteria are employed to discriminate precipitation of polymer in the course of polymerization from gelation:

Precipitation of polymer in the course of polymerization: The polymer that is not dischargeable but remains in the pressure vessel after completion of polymerization is partly dischargeable when being kept at the temperature of or above the melting point for a long time (Comparative Example 1).

Gelation: The polymer that is not dischargeable but remains in the pressure vessel after completion of polymerization is not dischargeable even when being kept at the temperature of or above the melting point for a long time (Comparative Examples 6 and 7).

Example 8

In a 3 L pressure vessel with a stirrer, 112 g of pentamethylene diamine, 229 g of diaminodecane, 413 g of 1,4-cyclohexane dicarboxylic acid (manufactured by Tokyo Chemical Industry Co., Ltd.) and 250 g of ion exchange water were supplied, were sealed and were subjected to nitrogen substitution. The mixture was heated with stirring. After the internal temperature reached 245° C. and the internal pressure reached 2.5 MPa, the internal pressure was maintained at 2.5 MPa for 50 minutes accompanied with distillation of water vapor. When the internal temperature reached 280° C., the internal pressure was released to the ordinary pressure over 60 minutes (internal temperature eventually reached 305° C.). Polymerization was then continued for 15 minutes under reduced pressure (40 kPa), so that a polyamide resin was obtained. The reaction proceeds in the closed system for a time period between the supply of the raw materials and the start of pressure relief, so that the water content at the time of application of heat and pressure is equal to the water content at the time of material supply. The maximum temperature during polymerization was 310° C.

Example 9

In a 3 L pressure vessel with a stirrer, 112 g of pentamethylene diamine, 246 g of diaminododecane, 396 g of 1,4-cyclohexane dicarboxylic acid and 250 g of ion exchange water were supplied, were sealed and were subjected to nitrogen substitution. The mixture was heated with stirring. After the internal temperature reached 245° C. and the internal pressure reached 2.5 MPa, the internal pressure was maintained at 2.5 MPa for 40 minutes accompanied with distillation of water vapor. When the internal temperature reached 270° C., the internal pressure was released to the ordinary pressure over 60 minutes (internal temperature eventually reached 298° C.). Polymerization was then continued for 15 minutes under reduced pressure (40 kPa), so that a polyamide resin was obtained. The reaction proceeds in the closed system for a time period between the supply of the raw materials and the start of pressure relief, so that the water content at the time of application of heat and pressure is equal to the water content at the time of material supply. The maximum temperature during polymerization was 303° C.

Example 10

In a 3 L pressure vessel with a stirrer, 135 g of pentamethylene diamine, 146 g of hexamethylene diamine, 408 g of terephthalic acid, 75 g of 12-aminododecanoic acid, 0.3277 g of sodium hypophosphite monohydrate and 250 g of ion exchange water were supplied, were sealed and were subjected to nitrogen substitution. The mixture was heated with stirring. After the internal temperature reached 237° C. and the internal pressure reached 2.2 MPa, the internal pressure was maintained at 2.2 MPa for 50 minutes accompanied with distillation of water vapor. When the internal temperature reached 280° C., the internal pressure was released to the ordinary pressure over 60 minutes (internal temperature eventually reached 320° C.). Polymerization was then continued for 15 minutes under reduced pressure (40 kPa), so that a polyamide resin was obtained. The reaction proceeds in the closed system for a time period between the supply of the raw materials and the start of pressure relief, so that the water content at the time of application of heat and pressure is equal to the water content at the time of material supply. The maximum temperature during polymerization was 325° C.

Example 11

In a 3 L pressure vessel with a stirrer, 165 g of pentamethylene diamine, 146 g of hexamethylene diamine, 408 g of terephthalic acid, 44 g of adipic acid, 0.3254 g of sodium hypophosphite monohydrate and 250 g of ion exchange water were supplied, were sealed and were subjected to nitrogen substitution. The mixture was heated with stirring. After the internal temperature reached 236° C. and the internal pressure reached 2.2 MPa, the internal pressure was maintained at 2.2 MPa for 50 minutes accompanied with distillation of water vapor. When the internal temperature reached 280° C., the internal pressure was released to the ordinary pressure over 60 minutes (internal temperature eventually reached 313° C.). Polymerization was then continued for 15 minutes under reduced pressure (40 kPa), so that a polyamide resin was obtained. The reaction proceeds in the closed system for a time period between the supply of the raw materials and the start of pressure relief, so that the water content at the time of application of heat and pressure is equal to the water content at the time of material supply. The maximum temperature during polymerization was 322° C. The composition (weight ratio) of the polyamide resin of this Example may be expressed from the supply amounts of the raw materials as 5T/6T/56=45/45/10 as shown in Table 5 given below (wherein 5T represents a structural unit consisting of pentamethylene diamine and terephthalic acid; 6T represents a structural unit consisting of hexamethylene diamine and terephthalic acid; and 56 represents a structural unit consisting of pentamethylene diamine and adipic acid). Since the respective raw materials are polymerized at random, it is estimated that the polyamide resin actually obtained also includes a structural unit consisting of hexamethylene diamine and adipic acid.

Comparative Example 9

A polyamide resin was obtained by the same procedure as Example 8, except that the internal pressure was changed to 1.7 MPa and the temperature at the start of pressure relief was changed to 284° C. The temperature at the end of pressure relief was 303° C., and the maximum temperature was 305° C.

Comparative Example 10

In a 3 L pressure vessel with a stirrer, 272 g of pentamethylene diamine, 232 g of terephthalic acid, 249 g of sebacic acid (manufactured by Kokura Synthetic Industries, Ltd.) and 250 g of ion exchange water were supplied, were sealed and were subjected to nitrogen substitution. The mixture was heated with stirring. After the internal temperature reached 227° C. and the internal pressure reached 1.7 MPa, the internal pressure was maintained at 1.7 MPa for 59 minutes accompanied with distillation of water vapor. When the internal temperature reached 248° C., the internal pressure was released to the ordinary pressure over 60 minutes (internal temperature eventually reached 282° C.). Polymerization was then continued for 15 minutes under reduced pressure (40 kPa), so that a polyamide resin was obtained. The reaction proceeds in the closed system for a time period between the supply of the raw materials and the start of pressure relief, so that the water content at the time of application of heat and pressure is equal to the water content at the time of material supply. The maximum temperature during polymerization was 285° C.

Comparative Example 11

In a 3 L pressure vessel with a stirrer, 283 g of pentamethylene diamine, 325 g of terephthalic acid, 149 g of sebacic acid and 250 g of ion exchange water were supplied, were sealed and were subjected to nitrogen substitution. The mixture was heated with stirring. After the internal temperature reached 245° C. and the internal pressure reached 2.5 MPa, the internal pressure was maintained at 2.5 MPa for 60 minutes accompanied with distillation of water vapor. When the internal temperature reached 290° C., the internal pressure was released to the ordinary pressure over 60 minutes (internal temperature eventually reached 325° C.). Polymerization was then continued for 15 minutes under reduced pressure (40 kPa), so that a polyamide resin was obtained. The reaction proceeds in the closed system for a time period between the supply of the raw materials and the start of pressure relief, so that the water content at the time of application of heat and pressure is equal to the water content at the time of material supply. The maximum temperature during polymerization was 330° C.

Comparative Example 12

In a 3 L pressure vessel with a stirrer, 297 g of pentamethylene diamine, 235 g of 1,4-cyclohexane dicarboxylic acid, 221 g of adipic acid (manufactured by Tokyo Chemical Industry Co., Ltd.) and 250 g of ion exchange water were supplied, were sealed and were subjected to nitrogen substitution. The mixture was heated with stirring. After the internal temperature reached 228° C. and the internal pressure reached 1.7 MPa, the internal pressure was maintained at 1.7 MPa for 62 minutes accompanied with distillation of water vapor. When the internal temperature reached 245° C., the internal pressure was released to the ordinary pressure over 60 minutes (internal temperature eventually reached 280° C.). Polymerization was then continued for 15 minutes under reduced pressure (40 kPa), so that a polyamide resin was obtained. The reaction proceeds in the closed system for a time period between the supply of the raw materials and the start of pressure relief, so that the water content at the time of application of heat and pressure is equal to the water content at the time of material supply. The maximum temperature during polymerization was 282° C.

The conditions of manufacturing the polyamide resins of Examples 8 to 11 and Comparative Examples 9 to 12 and the measurement results of the respective polyamide resins are summarized in Tables 5 and 6 given below.

TABLE 5

|  | EX 8 | EX 9 | EX 10 | EX 11 |
|---|---|---|---|---|
|  |  | weight ratio |  |  |
|  | 5C/10C = | 5C/12C = | 5T/6T/12 = | 5T/6T/56 = |
| Polymer Composition | 40/60 | 50/60 | 45/45/10 | 45/45/10 |
| Ratio of (A) to Gross Amount  mol % | 45.3 | 47.2 | 51.3 | 56.2 |

TABLE 5-continued

| Polymer Composition | | EX 8 | EX 9 | EX 10 | EX 11 |
|---|---|---|---|---|---|
| | | weight ratio | | | |
| | | 5C/10C = 40/60 | 5C/12C = 50/60 | 5T/6T/12 = 45/45/10 | 5T/6T/56 = 45/45/10 |
| of Diamine Component | | | | | |
| Ratio of (B) to Gross Amount of Dicarboxylic Acid Component | mol % | 100 | 100 | 100 | 89.1 |
| Water Content At Start of Application of Heat and Pressure | wt % | 25 | 25 | 25 | 25 |
| Pressure | MPa | 2.5 | 2.5 | 2.2 | 2.2 |
| Temperature at Start of Pressure Relief | ° C. | 280 | 270 | 280 | 280 |
| Temperature at End of Pressure Relief | ° C. | 305 | 298 | 320 | 313 |
| Maximum Temperature | ° C. | 310 | 303 | 325 | 322 |
| Discharge Rate | wt % | 95 | 99 | 98 | 99 |
| ηr | — | 3.1 | 2.8 | 2.4 | 2.3 |
| Piperidine | $\times 10^{-5}$ mol/g | 6.5 | 6.1 | 7.9 | 7.8 |
| Tm | ° C. | 292 | 272 | 300 | 295 |
| ΔHm | J/g | 32 | 30 | 33 | 35 |
| Mn | — | 13100 | 12100 | 13900 | 12000 |
| Mw | — | 61800 | 39200 | 41200 | 37900 |
| Mw/Mn | — | 3.19 | 3.24 | 2.96 | 3.16 |

5T: Structural unit consisting of pentamethylene diamine and terephthalic acid
6T: Structural unit consisting of hexamethylene diamine and terephthalic acid
5C: Structural unit consisting of pentamethylene diamine and 1,4-cyclohexane dicarboxylic acid
10C: Structural unit consisting of decane diamine and 1,4-cyclohexane dicarboxylic acid
12C: Structural unit consisting of dodecene diamine and 1,4-cyclohexane dicarboxylic acid
12: Structural unit consisting of aminododecene acid
56: Structural unit consisting of pentamethylene diamine and adipic acid

TABLE 6

| Polymer Composition | | COMP EX 9 | COMP EX 10 | COMP EX 11 | COMP EX 12 |
|---|---|---|---|---|---|
| | | weight ratio | | | |
| | | 5C/10C = 40/60 | 5T/510 = 50/50 | 5T/510 = 70/30 | 5C/56 = 50/50 |
| Ratio of (A) to Gross Amount of Diamine Component | mol % | 45.3 | 100 | 100 | 100 |
| Ratio of (B) to Gross Amount of Dicarboxylic Acid Component | mol % | 100 | 53.1 | 72.6 | 47.4 |
| Water Content At Start of Application of Heat and Pressure | wt % | 25 | 25 | 25 | 25 |
| Pressure | MPa | 1.7 | 1.7 | 2.5 | 1.7 |
| Temperature at Start of Pressure Relief | ° C. | 284 | 248 | 290 | 245 |
| Temperature at End of Pressure Relief | ° C. | 303 | 282 | 325 | 280 |
| Maximum Temperature | ° C. | 305 | 285 | 330 | 282 |
| Discharge Rate | wt % | 16 | 99 | 90 | 99 |
| ηr | — | 1.6 | 2.9 | 2.3 | 2.8 |
| Piperidine | $\times 10^{-5}$ mol/g | 5.7 | 3.9 | 4.5 | 3.2 |
| Tm | ° C. | 270 | 253 | 314 | 259 |
| ΔHm | J/g | 32 | 13 | 27 | 7 |
| Mn | — | 9250 | 11900 | 7930 | 18800 |
| Mw | — | 24800 | 34000 | 23000 | 54800 |
| Mw/Mn | — | 2.68 | 2.86 | 2.90 | 2.91 |

5T: Structural unit consisting of pentamethylene diamine and terephthalic acid
5C: Structural unit consisting of pentamethylene diamine and 1,4-cyclohexane dicarboxylic acid
10C: Structural unit consisting of decane diamine and 1,4-cyclohexanone dicarboxylic acid
56: Structural unit consisting of pentamethylene diamine and adipic acid
510: Structural unit consisting of pentamethylene diamine and sebacic acid According to comparison between Example 8 and Comparative Example 9, it is concluded that the polymerization pressure of 2.5 MPa ensures the discharge rate of or above 95%. In Comparative Example 9, a temporary abrupt increase of the stirring torque was observed, while the internal pressure was maintained at 1.7 MPa. In Comparative Example 9, it is accordingly estimated that about 84% of the polymer was not dischargeable since polymer precipitated in the state wound on the mixing blade in the course of polymerization.

According to Examples 10 and 11, it is shown that the polyamide resin having the excellent crystallinity (the large ΔHm) is obtainable even when a small amount of aminocarboxylic acid or adipic acid is copolymerized as the copolymerizable component.

According to Comparative Examples 10 to 12, it is shown that the polyamide resin having the excellent heat resistance and the excellent crystallinity is not obtainable at the small ratio of the (B) component relative to the gross amount of the dicarboxylic acid component.

Examples 12 to 17, Comparative Examples 13 to 17

Using a twin-screw extruder (TEX 30 manufactured by the Japan Steel Works, Ltd.) set to the cylinder temperature of 320° C. (295° C. only for Example 15) and the screw rotation speed of 150 rpm, a polyamide resin and an antioxidant were supplied from a main feeder and glass fibers, carbon fibers or an impact modifier were supplied from a side feeder at the composition shown in Tables 7 to 9 and melt kneaded. The polyamide resin and the antioxidant were pre-blended prior to the use. The extruded guts were pelletized, were vacuum dried at 120° C. for 24 hours, were injection molded (mold temperature: 150° C., but 140° C. only for Example 15) and were evaluated for mechanical properties.

The following glass fibers and the antioxidant were used:
Glass fibers: T289 manufactured by Nippon Electric Glass Co., Ltd.
Carbon fibers: TV 14-006 manufactured by Toray Industries, Inc.
Impact modifier: Tafmer MH 7020 manufactured by Mitsui Chemicals, Inc.
Antioxidant: Irganox 1098 (N,N'-hexamethylene-bis(3,5-di-t-butyl-4-hydroxyhydrocinnamide) manufactured by BASF SE The conditions of manufacturing the polyamide resin compositions of Examples 12 to 17 and Comparative Examples 13 to 17 and the measurement results of the flexural modulus and the tensile strength of the respective polyamide resin compositions are summarized in Tables 7 to 9 given below.

TABLE 7

|  |  | EX 12 | EX 13 | EX 14 | EX 15 |
|---|---|---|---|---|---|
| 5T/6T = 50/50 (EX 2) | parts by weight | 100 | 100 | 100 | 0 |
| 5T/10T = 40/60 (EX 6) | parts by weight | 0 | 0 | 0 | 100 |
| 5T/6T = 50/50 (COMP EX 4) | parts by weight | 0 | 0 | 0 | 0 |
| Glass fibers | parts by weight | 53.8 | 100 | 0 | 53.8 |
| Carbon fibers | parts by weight | 0 | 0 | 53.8 | 0 |
| Antioxident | parts by weight | 0.5 | 0.5 | 0 | 0 |

TABLE 7-continued

|  |  | EX 12 | EX 13 | EX 14 | EX 15 |
|---|---|---|---|---|---|
| Flexural modulus | GPa | 11.5 | 15.1 | 20.8 | 10.3 |
| Tensile strength | MPa | 210 | 248 | 187 | 204 |

5T: Structural unit consisting of pentamethylene diamine and terephthalic acid
6T: Structural unit consisting of hexamethylene diamine and terephthalic acid
10T: Structural unit consisting of decane diamine and terephalic acid

TABLE 8

|  |  | COMP EX 13 | COMP EX 14 | COMP EX 15 |
|---|---|---|---|---|
| 5T/6T = 50/50 (EX 2) | parts by weight | 0 | 0 | 0 |
| 5T/6T = 50/50 (COMP EX 4) | parts by weight | 100 | 100 | 100 |
| Glass fibers | parts by weight | 53.8 | 100 | 0 |
| Carbon fibers | parts by weight | 0 | 0 | 53.8 |
| Antioxident | parts by weight | 0.5 | 0.5 | 0 |
| Flexural modulus | GPa | 10.7 | 14.2 | 19.2 |
| Tensile strength | MPa | 195 | 233 | 177 |

5T: Structural unit consisting of pentamethylene diamine and terephthalic acid
6T: Structural unit consisting of hexamethylene diamine and terephthalic acid

TABLE 9

|  |  | EX 16 | EX 17 | COMP EX 16 | COMP EX 17 |
|---|---|---|---|---|---|
| 5T/6T = 50/50 (EX 2) | parts by weight | 100 | 100 | 0 | 0 |
| 5T/6T = 50/50 (COMP EX 4) | parts by weight | 0 | 0 | 100 | 100 |
| Impact modifier | parts by weight | 11.1 | 25 | 11.1 | 25 |
| Antioxidant | parts by weight | 0.5 | 0.5 | 0.5 | 0.5 |
| Flexural modulus | GPa | 2.45 | 2.01 | 2.33 | 1.95 |
| Tensile strength | MPa | 81 | 65 | 77 | 60 |

5T: Structural unit consisting of pentamethylene diamine and terephthalic acid
6T: Structural unit consisting of hexamethylene diamine and terephthalic acid According to comparison between Examples 12 to 14 and Examples 16 and 17 and Comparative Examples 13 to 17, it is concluded that the polyamide resin composition using the polyamide resin obtained by melt polymerization has the better flexural modulus and the better tensile strength than those of the polyamide resin composition using the polyamide resin obtained by solid phase polymerization.

INDUSTRIAL APPLICABILITY

The crystalline polyamide resin of the invention is preferably used for various applications such as electric and electronic-related parts, automobile and vehicle-related parts, household and office electric appliance-related parts, computer-related parts, facsimile and copying machine-related parts, machine-related parts, fibers and films.

The invention claimed is:
1. A production method of a crystalline polyamide resin by thermal polycondensation of a mixture including at least a diamine component, a dicarboxylic acid component and water as a starting material, wherein
the diamine component includes (A) pentamethylene diamine at a ratio that is equal to or greater than 10 mol % and less than 80 mol % relative to a gross amount of the diamine component, and
the dicarboxylic acid component includes (B) at least one selected from the group consisting of an aromatic dicarboxylic acid, an alicyclic dicarboxylic acid and dialkyl ester derivatives thereof at a ratio that is equal to or greater than 76 mol % and equal to or less than 100 mol % relative to a gross amount of the dicarboxylic acid component, the production method comprising:

a first step that heats the mixture, which has a water content equal to or less than 30% by weight, at a temperature equal to or higher than 200° C. under a pressure of 1.8 to 3.5 MPa to perform polycondensation with distillation of water;

a second step that releases pressure to an atmospheric pressure level, subsequent to the first step; and a third step that continues thermal polycondensation subsequent to the second step, so as to obtain the crystalline polyamide resin, the third step performing high-degree melt polymerization at a temperature that is equal to or higher than a melting point of the crystalline polyamide resin until a relative viscosity at 25° C. of a solution prepared by dissolving the obtained crystalline polyamide resin at a concentration of 0.01 mg/mL in 98% sulfuric acid reaches between 1.8 and 3.5, wherein the crystalline polyamide resin has heat of fusion measured by using a differential scanning calorimeter, which is equal to or greater than 30 J/g when temperature is decreased from a molten state to 30° C. at a temperature decrease rate of 20° C./minute and is subsequently increased at a temperature increase rate of 20° C./minute.

2. The production method of the crystalline polyamide resin according to claim 1, wherein the crystalline polyamide resin has a temperature of an endothermic peak corresponding to the melting point measured by using a differential scanning calorimeter, which is equal to or higher than 270° C. when temperature is decreased from a molten state to 30° C. at a temperature decrease rate of 20° C./minute and is subsequently increased at a temperature increase rate of 20° C./minute.

3. The production method of the crystalline polyamide resin according to claim 1, wherein the temperature at the start of pressure relief is equal to or lower than 295° C., and the temperature at the end of pressure relief is equal to or higher than the melting point in the second step.

4. The production method of the crystalline polyamide resin according to claim 1, wherein the high-degree melt polymerization in the third step is performed under reduced pressure or under an inert gas atmosphere.

5. A crystalline polyamide resin produced by thermal polycondensation of at least a diamine component and a dicarboxylic acid component, wherein the diamine component includes (A) pentamethylene diamine at a ratio that is equal to or greater than 10 mol % and less than 80 mol % relative to a gross amount of the diamine component, and the dicarboxylic acid component includes (B) at least one selected from the group consisting of an aromatic dicarboxylic acid, an alicyclic dicarboxylic acid and dialkyl ester derivatives thereof at a ratio that is equal to or greater than 76 mol % and equal to or less than 100 mol % relative to a gross amount of the dicarboxylic acid component, the crystalline polyamide resin having a relative viscosity between 1.8 and 3.5 at 25° C. of a solution prepared by dissolving the crystalline polyamide resin at a concentration of 0.01 mg/mL in 98% sulfuric acid, and having a degree of dispersion (weight-average molecular weight/number-average molecular weight) equal to or less than 3.5 measured by gel permeation chromatography, wherein the crystalline polyamide resin having heat of fusion measured by using a differential scanning calorimeter, which is equal to or greater than 30 J/g measured by using a differential scanning calorimeter when temperature is decreased from a molten state to 30° C. at a temperature decrease rate of 20° C./minute and is subsequently increased at a temperature increase rate of 20° C./minute.

6. The crystalline polyamide resin according to claim 5, wherein the crystalline polyamide resin having a temperature of an endothermic peak corresponding to a melting point measured by using a differential scanning calorimeter, which is equal to or higher than 270° C. when temperature is decreased from a molten state to 30° C. at a temperature decrease rate of 20° C./minute and is subsequently increased at a temperature increase rate of 20° C./minute.

7. The crystalline polyamide resin according to claim 5, wherein the crystalline polyamide resin having a piperidine content that is equal to or less than $10.0 \times 10^{-5}$ mol/g.

8. The crystalline polyamide resin according to claim 5, wherein (B) the at least one selected from the group consisting of the aromatic dicarboxylic acid, the alicyclic dicarboxylic acid and the dialkyl ester derivatives thereof includes at least an aromatic dicarboxylic acid, and the aromatic dicarboxylic acid is terephthalic acid and/or isophthalic acid.

9. A molded product produced by molding the crystalline polyamide resin according to claim 5.

10. A polyamide resin composition produced by further adding an inorganic filler to the crystalline polyamide resin according to claim 5.

11. A molded product produced by molding the crystalline polyamide resin composition according to claim 10.

12. A polyamide resin composition produced by further adding an impact modifier to the crystalline polyamide resin according to claim 5.

13. A molded product produced by molding the crystalline polyamide resin composition according to claim 12.

* * * * *